(12) United States Patent
Brannan et al.

(10) Patent No.: US 12,248,993 B2
(45) Date of Patent: Mar. 11, 2025

(54) CHATBOT FOR REVIEWING SOCIAL MEDIA

(71) Applicant: STATE FARM MUTUAL AUTOMOBILE INSURANCE COMPANY, Bloomington, IL (US)

(72) Inventors: Joseph Robert Brannan, Bloomington, IL (US); Vicki King, Bloomington, IL (US); Brian Mark Fields, Phoenix, AZ (US); Nathan L. Tofte, Downs, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 18/234,464

(22) Filed: Aug. 16, 2023

(65) Prior Publication Data
US 2024/0414105 A1    Dec. 12, 2024

Related U.S. Application Data

(60) Provisional application No. 63/525,234, filed on Jul. 6, 2023, provisional application No. 63/471,324, filed on Jun. 6, 2023.

(51) Int. Cl.
*H04L 51/02*    (2022.01)
*G06F 40/30*    (2020.01)
(Continued)

(52) U.S. Cl.
CPC ............ *G06Q 40/08* (2013.01); *G06F 40/30* (2020.01); *G06N 3/006* (2013.01); *G06Q 50/01* (2013.01);
(Continued)

(58) Field of Classification Search
CPC . H04L 51/04; H04M 1/72436; H04M 7/0045; G06Q 30/0619; G06Q 30/0625; G06Q 30/0631; G06Q 30/06
See application file for complete search history.

(56) References Cited

U.S. PATENT DOCUMENTS

| 7,698,342 B1 | 4/2010 | Evans et al. |
| 8,095,393 B2 | 1/2012 | Seifert et al. |

(Continued)

FOREIGN PATENT DOCUMENTS

| EP | 3239686 A1 | 11/2017 |
| EP | 3578433 B1 | 8/2020 |

(Continued)

OTHER PUBLICATIONS

Anonymous, Roots Automation Introduces InsurGPT—the World's Most Advanced Generative AI Model for Insurance. Retrieved from the Internet at: https://ffnews.com/newsarticle/roots-automation-introduces-insurgpt-the-worlds-most-advanced-generative-ai-model-for-insurance/ (published May 15, 2023).

(Continued)

*Primary Examiner* — Chirag R Patel
(74) *Attorney, Agent, or Firm* — MARSHALL, GERSTEIN & BORUN LLP

(57) ABSTRACT

The following relates generally to artificial intelligence (AI)-based responses to social media posts. In some embodiments, one or more processors may be configured to: (1) receive, via a chatbot, a social media post; (2) categorize, via the chatbot, the social media post; (3) determine, via the chatbot, based upon the categorization, an entity to contact; (4) build, via the chatbot, based upon the determined entity to contact, a response to the social media post; and/or (5) send, via the chatbot, the response to the entity.

16 Claims, 14 Drawing Sheets

(51) Int. Cl.
  *G06N 3/006* (2023.01)
  *G06Q 40/08* (2012.01)
  *G06Q 50/00* (2012.01)
  *H04L 41/16* (2022.01)
  *G06Q 30/016* (2023.01)

(52) U.S. Cl.
  CPC .............. *H04L 41/16* (2013.01); *H04L 51/02* (2013.01); *G06Q 30/016* (2013.01)

(56) References Cited

U.S. PATENT DOCUMENTS

| | | | |
|---|---|---|---|
| 9,830,748 | B2 | 11/2017 | Rosenbaum |
| 9,990,782 | B2 | 6/2018 | Rosenbaum |
| 10,055,793 | B1 | 8/2018 | Call et al. |
| 10,269,190 | B2 | 4/2019 | Rosenbaum |
| 10,467,824 | B2 | 11/2019 | Rosenbaum |
| 10,635,751 | B1 | 4/2020 | Relangi et al. |
| 11,127,081 | B1 | 9/2021 | Kullman et al. |
| 11,227,452 | B2 | 1/2022 | Rosenbaum |
| 11,250,515 | B1 | 2/2022 | Feiteira et al. |
| 11,407,410 | B2 | 8/2022 | Rosenbaum |
| 11,518,391 | B1 | 12/2022 | Sanchez |
| 11,524,707 | B2 | 12/2022 | Rosenbaum |
| 11,594,083 | B1 | 2/2023 | Rosenbaum |
| 11,669,907 | B1 | 6/2023 | Behrens et al. |
| 11,720,903 | B1 | 8/2023 | Henryson et al. |
| 11,790,296 | B1 | 10/2023 | Henryson et al. |
| 11,837,004 | B1* | 12/2023 | Agrahari ............... G06F 40/143 |
| 11,922,515 | B1* | 3/2024 | Lombard ................ G06F 40/35 |
| 2001/0027403 | A1 | 10/2001 | Peterson et al. |
| 2002/0002475 | A1 | 1/2002 | Freedman et al. |
| 2002/0112011 | A1* | 8/2002 | Washington ........... G06Q 10/00 709/206 |
| 2009/0125320 | A1* | 5/2009 | Bickett .................. G06Q 30/02 705/1.1 |
| 2009/0240531 | A1 | 9/2009 | Hilborn |
| 2009/0287509 | A1 | 11/2009 | Basak et al. |
| 2010/0145734 | A1 | 6/2010 | Becerra et al. |
| 2011/0119574 | A1 | 5/2011 | Rogers et al. |
| 2011/0295623 | A1 | 12/2011 | Behringer et al. |
| 2011/0313794 | A1 | 12/2011 | Feeney |
| 2012/0101852 | A1 | 4/2012 | Albert |
| 2012/0124485 | A1 | 5/2012 | Scherpa et al. |
| 2012/0143634 | A1 | 6/2012 | Beyda et al. |
| 2012/0303390 | A1 | 11/2012 | Brook et al. |
| 2013/0218603 | A1 | 8/2013 | Hagelstein et al. |
| 2014/0094991 | A1 | 4/2014 | Bouillet et al. |
| 2014/0222469 | A1 | 8/2014 | Stahl et al. |
| 2014/0358731 | A1* | 12/2014 | Itte ...................... G06Q 30/0631 705/26.61 |
| 2014/0379385 | A1 | 12/2014 | Duncan et al. |
| 2015/0170288 | A1 | 6/2015 | Harton et al. |
| 2015/0213556 | A1 | 7/2015 | Haller, Jr. |
| 2015/0339759 | A1* | 11/2015 | Pope .................. G06Q 30/0631 705/26.62 |
| 2016/0071217 | A1 | 3/2016 | Edwards et al. |
| 2017/0103346 | A1 | 4/2017 | Bodell et al. |
| 2017/0132643 | A1 | 5/2017 | Sagade et al. |
| 2018/0082683 | A1 | 3/2018 | Chen et al. |
| 2018/0173999 | A1 | 6/2018 | Renard |
| 2018/0293660 | A1 | 10/2018 | Rakshe et al. |
| 2019/0095822 | A1* | 3/2019 | Rugel ..................... G06N 20/00 |
| 2019/0114715 | A1 | 4/2019 | Hessinger et al. |
| 2019/0332661 | A1 | 10/2019 | Halprin et al. |
| 2020/0154170 | A1* | 5/2020 | Wu ..................... H04N 21/4666 |
| 2020/0210490 | A1 | 7/2020 | Hutchins |
| 2020/0274962 | A1 | 8/2020 | Martin et al. |
| 2020/0339160 | A1 | 10/2020 | Rosenbaum |
| 2021/0064932 | A1 | 3/2021 | Wang et al. |
| 2021/0073330 | A1 | 3/2021 | Inagaki et al. |
| 2021/0117923 | A1 | 4/2021 | Gray et al. |
| 2021/0152496 | A1* | 5/2021 | Kim ........................ H04L 51/02 |
| 2021/0295203 | A1* | 9/2021 | Liao ........................ G06N 3/006 |
| 2021/0365955 | A1 | 11/2021 | Galante et al. |
| 2021/0390950 | A1* | 12/2021 | Kumar .................. H04L 51/224 |
| 2022/0004630 | A1 | 1/2022 | Almukaynizi et al. |
| 2022/0092893 | A1 | 3/2022 | Rosenbaum |
| 2022/0279014 | A1 | 9/2022 | Stokes et al. |
| 2022/0340148 | A1 | 10/2022 | Rosenbaum |
| 2023/0017739 | A1 | 1/2023 | Feldman et al. |
| 2023/0060300 | A1 | 3/2023 | Rosenbaum |
| 2023/0116639 | A1 | 4/2023 | Patt et al. |
| 2023/0140931 | A1 | 5/2023 | Anderson et al. |
| 2023/0290502 | A1 | 9/2023 | Zhi et al. |
| 2023/0316412 | A1 | 10/2023 | Behrens et al. |
| 2024/0073219 | A1 | 2/2024 | Maizels et al. |
| 2024/0256780 | A1 | 8/2024 | Douglas et al. |
| 2024/0371367 | A1 | 11/2024 | Churgin et al. |

FOREIGN PATENT DOCUMENTS

| | | |
|---|---|---|
| EP | 3730375 B1 | 10/2021 |
| EP | 3960576 A1 | 3/2022 |
| EP | 4190659 A1 | 6/2023 |
| EP | 4190660 A1 | 6/2023 |

OTHER PUBLICATIONS

Introducing Agent M—a powerful Large Language model or ChatGPT based Master Agent developer framework, powered by Floatbot platform, that lets you create multiple application-specific LLM-based Agent(s). Retrieved from the internet at: <URL:https://www.linkedin.com/posts/jimmypadia_nyse-floor-talk-floatbot-activity-7089664064603234304-60TU?utm_source=share&utm_medium=member_android> (2023).

Isenberg, The Compliance Tasks ChatGPT Can (and Can't) Handle, Ignites (published Apr. 3, 2023).

Morelli, Will ChatGPT, artificial intelligence replace financial professionals any time soon?, Insurance NewsNet. Retrieved from the Internet at: <https://insurancenewsnet.com/innarticle/will-chatgpt-artificial-intelligence-replace-financial-professionals-any-time-soon> (published Jan. 23, 2023).

Morris, Morgan Stanley Developing Chatbot with OpenAI, Ignites (published Mar. 15, 2023).

Munk, Will AI models like ChatGPT take your insurance job?, Life Annuity Speciality (published Mar. 7, 2023).

Rengachary et al., ChatGPT: A Conversation About Underwriting and Life Insurance. Retrieved from the internet at: https://www.coverager.com/chatgpt-a-conversation-about-underwriting-and-life-insurance/ (published Apr. 3, 2023).

Smith, Insurer Zurich experiments with ChatGPT for claims and data mining, Financial Times (published Mar. 24, 2023).

Tuohy, What ChatGPT's Chores May Look Like in Life Insurance Industry, Life Annuity Specialist (published Apr. 21, 2023).

Wilson, Should Financial Services Companies Consider Open AI?, LIMRA.com MarketFacts (published Mar. 2023).

Dickson, How to create a private ChatGPT that interacts with your local documents, TechTalks. Retrieved from the Internet at: <URL:https://bdtechtalks.com/2023/06/01/create-privategpt-local-llm/> (Jun. 2023).

OpenPR Worldwide Public Relations, Press release, "Floatbot.AI Unveils Revolutionary Agent M—Generative AI (LLM or ChatGPT) Based Master Agent developer framework," Web page downloaded from Internet at <https://www.openpr.com/news/3147235/floatbot-ai-unveils-revolutionary-aqent-m-generative-ai-llm>. Retrieved from Internet on Aug. 1, 2023.

The Future of Car Insurance #2: How AI is Transforming Auto Insurance for Companies and Drivers, Brogan Woodburn, Rashawn Mitchner, dated Jun. 22, 2023. (Year: 2023).

STIC EIC Search Report for U.S. Appl. No. 18/196,691 (Year: 2024).

* cited by examiner

500

510

520

This company is terrible. The last three products I've bought from them are defective!

600

610

620

This hammer I bought is horrible. After only one month of light use, the handle broke!

700

710 — COMPANY LOGO

720 — This company is fantastic. The last three products I've bought from them have been great!

800

810

820 — This lawn mower has been great. It cuts the grass perfectly!

1100

COMPLAINT REPORT

1110

1120

Summary: Customer John Doe has complained on social media site XYZ about product ABC.

1200

1210

COMPANY LOGO

1220

Hi Jane Doe!
We noticed your social media post regarding the lawnmower you purchased. Would you mind writing a review of our company? Also, we recommend considering purchasing the following products: ...

1500

INSURANCE CLAIM COMPLAINT

1510 →

Insurance Customer: John Doe
Type of Insurance Policy: Homeowners
Insurance Policy Number: XXX-XXXXXX
Date of Insurance Claim: XX/XX/XXXX
Date of Complaint about Insurance Claim: XX/XX/XXXX
Insurance Claim Details: XXXXX

1520 →

Insurance Claim Complaint: XXXXXXXXXXXXXXXXXXXXXXXX

COMPLAINT REPORT  1660

1605 → Category of Complaint: Tone

1610 →
Insurance Customer: John Doe
Type of Insurance Policy: Renters
Insurance Policy Number: XXX-XXXXXX
Date of Insurance Claim: XX/XX/XXXX
Date of Complaint about Insurance Claim: XX/XX/XXXX
Insurance Claim Details: XXXXX
Customer Left Insurance Company: No 1620 → Summary of Insurance Claim Complaint: XXXXXXXXXXXXXXXXXXXXXXXX 1630 → Text of Insurance Claim Complaint: XXXXXXXXXXXXXXXXX 1640 → Quotation from correspondence between insurance customer and claims adjuster on June 15, 2024 at 10:01 AM: XXXXXXXX 1650 → Quotation from correspondence between insurance customer and insurance agent on July 1, 2024 at 11:32 AM: XXXXXXXX

1910 → COMPLAINT REPORT

1920 ↘  1930 ↘

| Complaint | Category | Subcategory | Complaint Date | Summary |
|---|---|---|---|---|
| 1 | Tone | Rudeness of claims adjuster | XX/XX/XX | XXXXXXXXXXX |
| 2 | Policy | Insurance policy did not cover damage or loss | XX/XX/XX | XXXXXXXXXXX |
| 3 | Policy | Deductible was too high | XX/XX/XX | XXXXXXXXXXX |
| 4 | Tone | Length of time it took a claims adjuster to respond | XX/XX/XX | XXXXXXXXXXX |
| 5 | Tone | Difficulties with app and/or website | XX/XX/XX | XXXXXXXXXXX |
| 6 | Policy | Subsequent increase in insurance policy premium | XX/XX/XX | XXXXXXXXXXX |

FIG. 19

CHATBOT FOR REVIEWING SOCIAL MEDIA

CROSS REFERENCE TO RELATED APPLICATIONS

This application claims the benefit of: (1) U.S. Provisional Application No. 63/525,234, entitled "Chatbot For Reviewing Social Media and/or Reviewing Insurance Claims Complaints" (filed Jul. 6, 2023); and (2) U.S. Provisional Application No. 63/471,324, entitled "Chatbot For Reviewing Social Media" (filed Jun. 6, 2023), the entirety of each of which is incorporated by reference herein.

FIELD

The present disclosure generally relates to artificial intelligence (AI)-based responses to social media posts, and/or AI-based review of insurance claims complaints.

BACKGROUND

Social media is ubiquitous in today's society. People use social media not only to interact with each other, but also to interact with companies. For example, a customer may use social media to complain about a company, product, or service. Alternatively, a customer may use social media to praise a company, product, or service. However, current solutions for companies to respond to such social media posts may be cumbersome and/or inefficient.

Furthermore, in an insurance context, following the filing of an insurance claim, an insurance customer may complain about how her insurance claim was handled (e.g., complain via social media, or complain directly to the insurance company). However, if there is a large volume of insurance claims complaints, it may be difficult for the insurance company to sort and/or address the insurance claims complaints.

The systems and methods disclosed herein provide solutions to these problems and may provide solutions to the ineffectiveness, insecurities, difficulties, inefficiencies, encumbrances, and/or other drawbacks of conventional techniques.

SUMMARY

The present embodiments relate to, inter alia, (AI)-based responses to social media posts. For example, a chatbot may review social media posts, and determine posts that are relevant to a company (e.g., an insurance company, etc.). In some examples, the chatbot finds posts including issues that need to be addressed (e.g., customer complains about company; employee complains about job; etc.). In other examples, the chatbot finds positive posts (e.g., customer praises insurance agent, etc.), and brings the positive posts to the company's attention. The company may then reward the employee that was praised, ask the poster to write a review of the company, etc. The chatbot may also look for new/prospective customers (e.g., an insurance company looks for potential insurance customers, etc.). For example, the chatbot may identify a person who is looking to buy a car, a house, and/or life insurance, and then provide company with the person's contact information.

In one aspect, a computer-implemented method for responding to a social media post may be provided. The method may be implemented via one or more local or remote processors, sensors, transceivers, servers, memory units, augmented reality glasses or headsets, virtual reality headsets, extended or mixed reality headsets, smart glasses or watches, wearables, voice bot or chatbot, ChatGPT bot, and/or other electronic or electrical components, which may be in wired or wireless communication with one another. For instance, in one example, the method may include: (1) receiving, via a chatbot of one or more processors, a social media post; (2) categorizing, via the chatbot, the social media post; (3) determining, via the chatbot, based upon the categorization, an entity to contact; (4) building, via the chatbot, based upon the determined entity to contact, a response to the social media post; and/or (5) sending, via the chatbot, the response to the entity. The method may include additional, fewer, or alternate actions, including those discussed elsewhere herein.

In another aspect, a computer system configured for responding to a social media post may be provided. The computer system may include one or more local or remote processors, sensors, transceivers, servers, memory units, augmented reality glasses or headsets, virtual reality headsets, extended or mixed reality headsets, smart glasses or watches, wearables, voice bot or chatbot, ChatGPT bot, and/or other electronic or electrical components, which may be in wired or wireless communication with one another. For example, in one instance, the computer system may include one or more processors configured to: (1) receive, via a chatbot, a social media post; (2) categorize, via the chatbot, the social media post; (3) determine, via the chatbot, based upon the categorization, an entity to contact; (4) build, via the chatbot, based upon the determined entity to contact, a response to the social media post; and/or (5) send, via the chatbot, the response to the entity. The computer system may include additional, less, or alternate functionality, including that discussed elsewhere herein.

In yet another aspect, a computer device configured for responding to a social media post may be provided. The computer device may include one or more local or remote processors, sensors, transceivers, servers, memory units, augmented reality glasses or headsets, virtual reality headsets, extended or mixed reality headsets, smart glasses or watches, wearables, voice bot or chatbot, ChatGPT bot, and/or other electronic or electrical components. For instance, in one example, the computer device may include: one or more processors; and/or one or more memories coupled to the one or more processors. The one or more memories including computer executable instructions stored therein that, when executed by the one or more processors, may cause the one or more processors to: (1) receive, via a chatbot, a social media post; (2) categorize, via the chatbot, the social media post; (3) determine, via the chatbot, based upon the categorization, an entity to contact; (4) build, via the chatbot, based upon the determined entity to contact, a response to the social media post; and/or (5) send, via the chatbot, the response to the entity. The computer device may include additional, less, or alternate functionality, including that discussed elsewhere herein.

The present embodiments also relate to, inter alia, AI-based review of insurance claims complaints. For example, a chatbot may review insurance claims complaints, and identify top reasons for complaints so that they may be addressed. Complaints may be sorted into different categories. Example categories include: a "tone" category (e.g., claims adjuster was rude to insurance customer, claims adjuster took too long to respond to insurance customer's voicemail messages, etc.) (e.g., a "non-policy" category); and a "policy" category (e.g., insurance policy didn't cover the damage to my roof, etc.). Complaints may also be categorized based on the type of insurance policy claim. The chatbot may also find trends in complaints. The chatbot may also analyze if complaining insurance customer left the insurance company during a time period following the complaint. The chatbot may also conduct and/or monitor internet searches (e.g., GOOGLE searches, etc.), emails, etc. to find customer complaints. Chatbot may assemble an aggregated report (e.g., a table) of complaint information. The complaint report may be automatically sent to customer service to act.

In one aspect, a computer-implemented method for reviewing insurance claims complaints may be provided. The method may be implemented via one or more local or remote processors, sensors, transceivers, servers, memory units, augmented reality glasses or headsets, virtual reality headsets, extended or mixed reality headsets, smart glasses or watches, wearables, voice bot or chatbot, ChatGPT bot, and/or other electronic or electrical components, which may be in wired or wireless communication with one another. For instance, in one example, the method may include: (1) receiving, via a chatbot of one or more processors, an insurance claim complaint; (2) categorizing, via the chatbot, the insurance claim complaint by determining a category of the insurance claim complaint, the category comprising a tone category or a policy category; (3) building, via the chatbot, a complaint report including information of the insurance claim complaint and an indication of the category; and/or (4) sending, via the chatbot, the complaint report to an insurance complaint administrator computing device. The method may include additional, fewer, or alternate actions, including those discussed elsewhere herein.

In another aspect, a computer system for reviewing insurance claims complaints may be provided. The computer system may include one or more local or remote processors, sensors, transceivers, servers, memory units, augmented reality glasses or headsets, virtual reality headsets, extended or mixed reality headsets, smart glasses or watches, wearables, voice bot or chatbot, ChatGPT bot, and/or other electronic or electrical components, which may be in wired or wireless communication with one another. For example, in one instance, the computer system may include one or more processors configured to: (1) receive, via a chatbot, an insurance claim complaint; (2) categorize, via the chatbot, the insurance claim complaint by determining a category of the insurance claim complaint, the category comprising a tone category or a policy category; (3) build, via the chatbot, a complaint report including information of the insurance claim complaint and an indication of the category; and/or (4) send, via the chatbot, the complaint report to an insurance complaint administrator computing device. The computer system may include additional, less, or alternate functionality, including that discussed elsewhere herein.

In yet another aspect, a computer device for reviewing insurance claims complaints may be provided. The computer device may include one or more local or remote processors, sensors, transceivers, servers, memory units, augmented reality glasses or headsets, virtual reality headsets, extended or mixed reality headsets, smart glasses or watches, wearables, voice bot or chatbot, ChatGPT bot, and/or other electronic or electrical components. For instance, in one example, the computer device may include: one or more processors; and/or one or more memories coupled to the one or more processors. The one or more memories including computer executable instructions stored therein that, when executed by the one or more processors, may cause the one or more processors to: (1) receive, via a chatbot, an insurance claim complaint; (2) categorize, via the chatbot, the insurance claim complaint by determining a category of the insurance claim complaint, the category comprising a tone category or a policy category; (3) build, via the chatbot, a complaint report including information of the insurance claim complaint and an indication of the category; and/or (4) send, via the chatbot, the complaint report to an insurance complaint administrator computing device. The computer device may include additional, less, or alternate functionality, including that discussed elsewhere herein.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

FIG. 15 depicts an exemplary insurance claim complaint.

FIG. 16 depicts an exemplary complaint report of an exemplary tone category complaint.

FIG. 19 depicts an exemplary complaint report including a table with indications of the complaint category and subcategory.

DETAILED DESCRIPTION

The present embodiments relate to, inter alia, (AI)-based responses to social media posts. For example, a chatbot may review social media posts, and determine posts that are relevant to a company (e.g., an insurance company, other business entity, etc.). In some examples, the chatbot finds posts including issues that need to be addressed (e.g., customer complains about company; employee complains about job; etc.). In other examples, the chatbot finds positive posts (e.g., customer praises insurance agent, etc.), and brings the positive posts to the company's attention. The company may then reward the employee that was praised, ask the poster to write a review of the company, etc. The chatbot may also look for new/prospective customers (e.g., an insurance company looks for potential insurance customers, etc.). For example, the chatbot may identify a person who is looking to buy a car, a house, and/or life insurance, and then provide company with the person's contact information.

Exemplary System—AI-Based Responding to Social Media Posts

Figure 1:
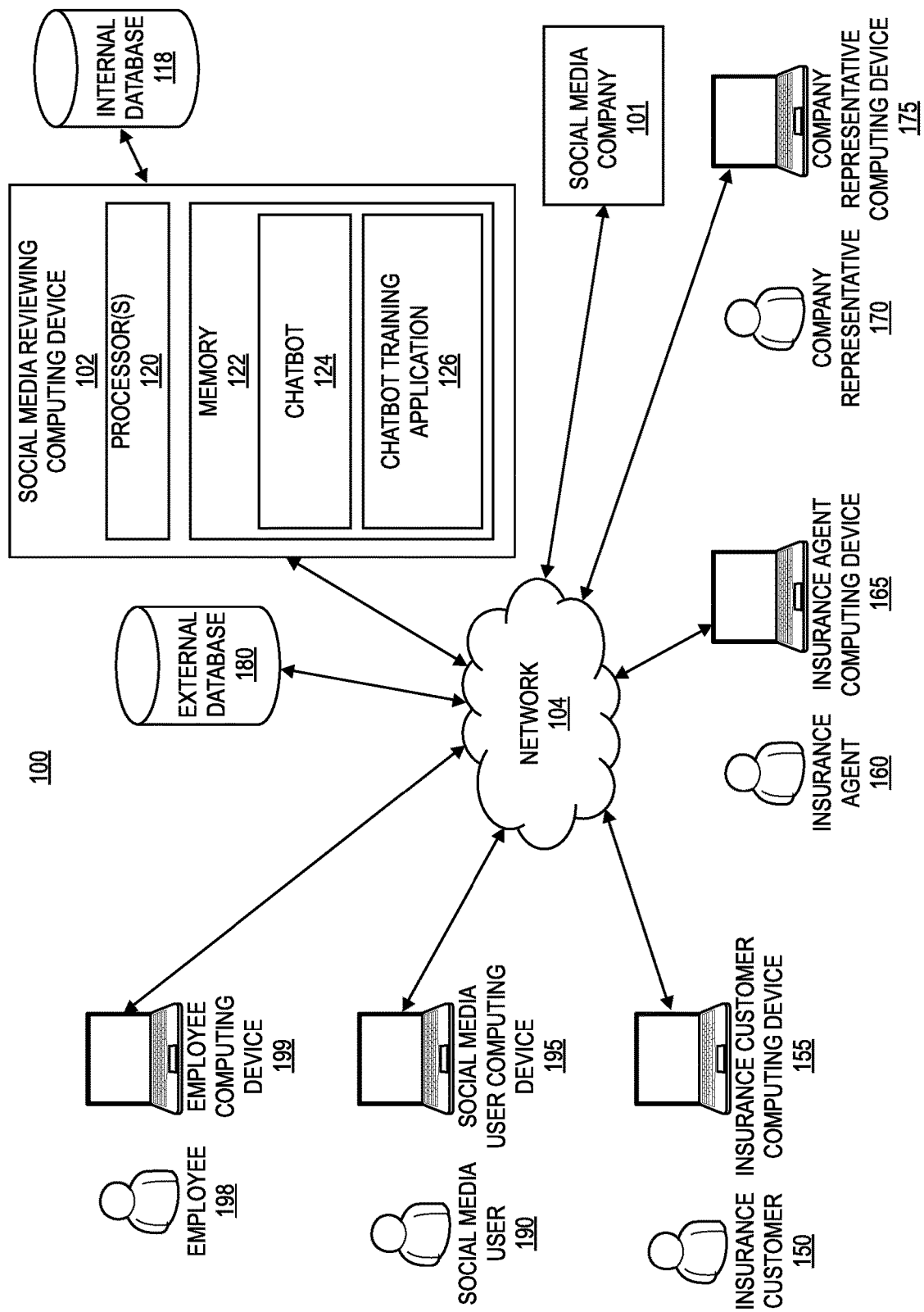
FIG. 1 illustrates an exemplary computer system for responding to social media posts, according to one embodiment.

To this end, FIG. 1 illustrates an exemplary computer system 100 for responding to social media posts in which the exemplary computer-implemented methods described herein may be implemented. The high-level architecture includes both hardware and software applications, as well as various data communications channels for communicating data between the various hardware and software components.

The exemplary system 100 may include social media reviewing computing device 102, which may include one or more processors 120, such as one or more microprocessors, controllers, and/or any other suitable type of processor. The social media reviewing computing device 102 may further include a memory 122 (e.g., volatile memory, non-volatile memory) accessible by the one or more processors 120, (e.g., via a memory controller). The one or more processors 120 may interact with the memory 122 to obtain and execute, for example, computer-readable instructions stored in the memory 122. Additionally or alternatively, computer-readable instructions may be stored on one or more removable media (e.g., a compact disc, a digital versatile disc, removable flash memory, etc.) that may be coupled to the social media reviewing computing device 102 to provide access to the computer-readable instructions stored thereon. In particular, the computer-readable instructions stored on the memory 122 may include instructions for executing various applications, such as chatbot 124 (which may additionally or alternatively be voicebot 124), and/or chatbot training application 126. It should be understood that although 124 is labeled as chatbot, 124 may additionally or alternatively be a voicebot. It should further be understood that chatbot/voicebot 124 may be an AI and/or ML chatbot/voicebot, or a ChatGPT or ChatGPT-based bot.

A company that owns the social media reviewing computing device 102 may be any type of company, such as an insurance company, a contractor, a software company, a manufacturing company, a law firm, a financial services firm, a retailer, a healthcare provider, etc. The company may use the social media reviewing computing device 102 (e.g., via the chatbot 124) to respond to social media posts about the company, or any other company.

To this end, the chatbot 124 may, inter alia, receive a social media post (e.g., from the social media company 101, and/or the external database 180, which may be a database that aggregates social media posts). The chatbot 124 may then categorize the social media post, and determine an entity to contact (e.g., social media user 190, insurance customer 150 [if the company is an insurance company], company representative 170, employee 198, etc.) based upon the categorization. The chatbot 124 may then build and/or send (e.g., send to the determined entity) a response to the social media post.

Categories that the social media posts are categorized into may be any suitable categories. Examples of categories include: (i) customer complaint about a company; (ii) customer complaint about a product and/or service; (iii) customer praise of the company; (iv) customer praise of the product and/or service; (v) employee complaint about the company; (vi) employee praise of the company; etc. FIGS. 5-10 show examples social media posts corresponding to the categories.

Figure 5:
FIG. 5 illustrates an exemplary social media post corresponding to a category of a customer complaint about a company.

More specifically, FIG. 5 illustrates an exemplary social media post 500 corresponding to a category of a customer complaint about a company. The illustrated exemplary social media post 500 includes a company logo 510 (e.g., the logo of the company that the customer is complaining about). The illustrated exemplary social media post 500 further includes statement 520, which states: "This company is terrible. The last three products I've bought from them are defective!"

Figure 6:
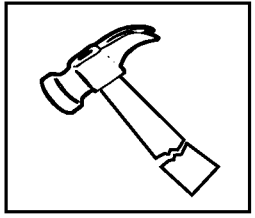
FIG. 6 illustrates an exemplary social media post corresponding to a category of customer complaint about a product and/or service.

FIG. 6 illustrates an exemplary social media post 600 corresponding to a category of customer complaint about a product and/or service. The illustrated exemplary social media post 600 includes a picture 610 (e.g., a picture of the allegedly defective product). The illustrated exemplary social media post 600 further includes statement 620, which states: "This hammer I bought is horrible. After only one month of light use, the handle broke!"

Figure 7:
FIG. 7 illustrates an exemplary social media post corresponding to a category of customer praise of the company.

FIG. 7 illustrates an exemplary social media post 700 corresponding to a category of customer praise of the company. The illustrated exemplary social media post 700 includes a company logo 710 (e.g., a logo of the company that the customer is praising). The illustrated exemplary social media post 700 further includes statement 720, which states: "This company is fantastic. The last three products I've bought from them have been great!"

Figure 8:
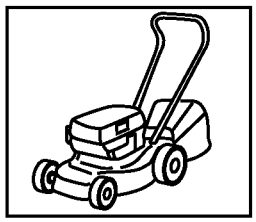
FIG. 8 illustrates an exemplary social media post corresponding to a category of customer praise of a product and/or service.

FIG. 8 illustrates an exemplary social media post 800 corresponding to a category of customer praise of a product and/or service. The illustrated exemplary social media post 800 includes a picture 810 (e.g., a picture of the product that the customer is praising). The illustrated exemplary social media post 800 further includes statement 820, which states: "This lawn mower has been great. It cuts the grass perfectly!"

Figure 9:
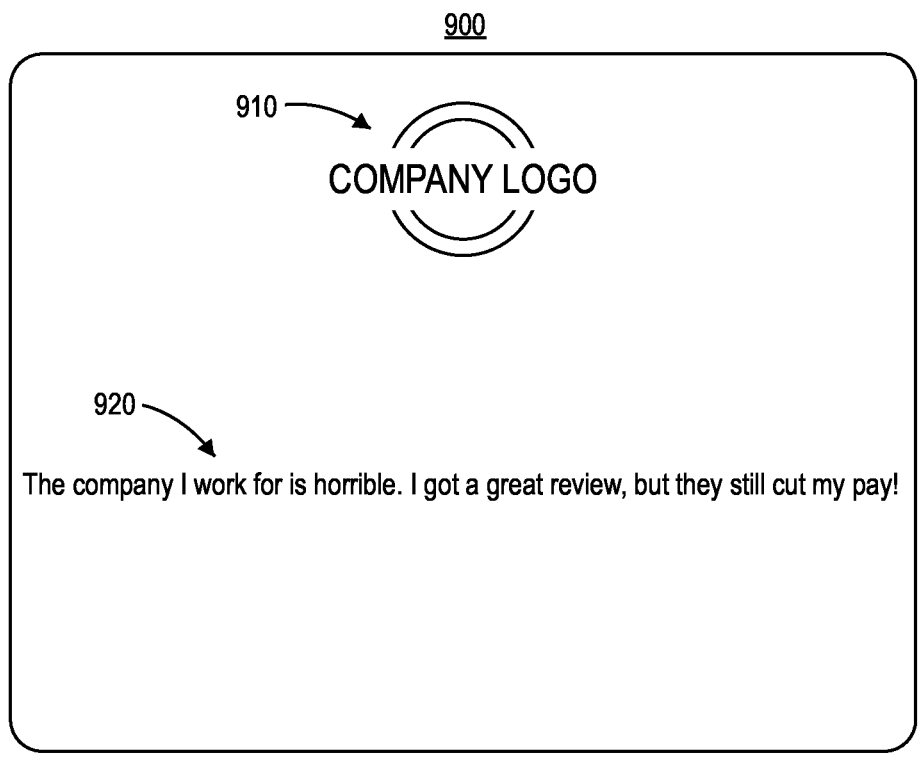
FIG. 9 illustrates an exemplary social media post corresponding to a category of employee complaint about the company.

FIG. 9 illustrates an exemplary social media post 900 corresponding to a category of employee complaint about the company. The illustrated exemplary social media post 900 includes a company logo 910 (e.g., a logo of the company that the employee works for). The illustrated exemplary social media post 900 further includes statement 920, which states: "The company I work for is horrible. I got a great review, but they still cut my pay!"

Figure 10:
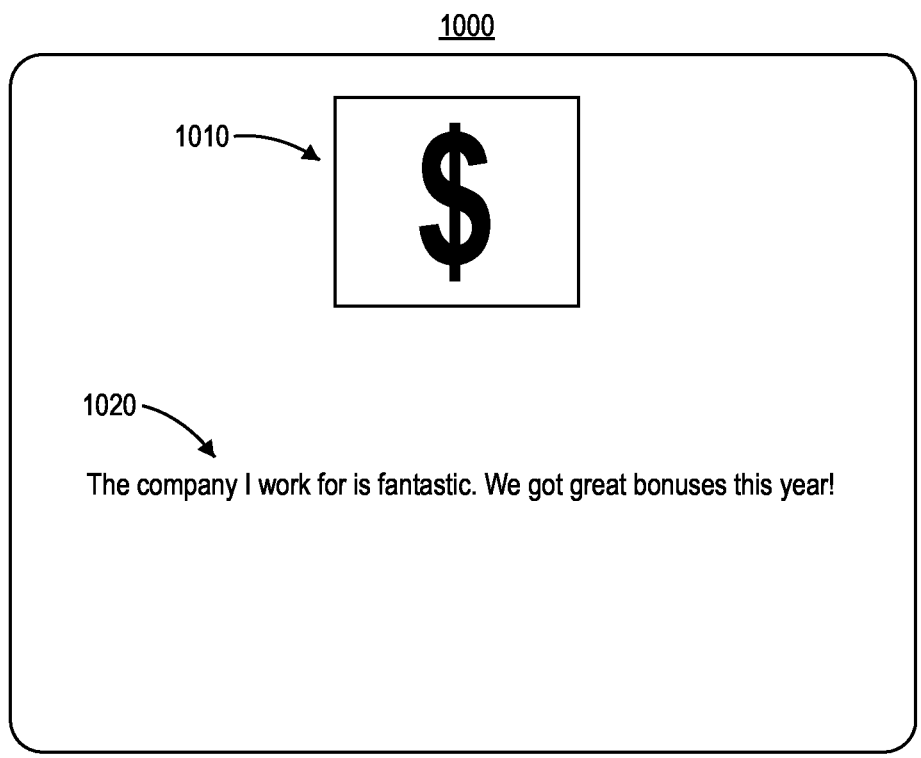
FIG. 10 illustrates an exemplary social media post corresponding to a category of employee praise of the company.

FIG. 10 illustrates an exemplary social media post 1000 corresponding to a category of employee praise of the company. The illustrated exemplary social media post 1000 includes a picture 1010 (e.g., a picture that the employee has posted, possibly related to the nature of the praise). The illustrated exemplary social media post 1000 further includes statement 1020, which states: "The company I work for is fantastic. We got great bonuses this year!"

As mentioned above the response that the chatbot 124 builds may be based upon the determined entity to contact. Examples of the entity to contact include: the company representative 170; the social media user 190 (e.g., a social media user who posted a review of a product and/or company); the employee 198 (e.g., an employee of the company who posted about the company, or who is being contacted because of a social media post about another social media user); and the insurance agent 160.

The company representative 170 may use company representative computing device 175 (e.g., to review and/or respond to a response sent to her by the chatbot 124). The company representative computing device 175 may be any suitable device, such as a computer, a smartphone, a laptop, a phablet, etc. It should be appreciated that the company representative computing device 175 may include one or more processors (e.g., one or more microprocessors, controllers, and/or any other suitable type of processor), one or more memories, one or more displays, etc.

Figures 11, 12:
FIG. 11 depicts an exemplary response to a social media post, which may be sent to a company representative.
FIG. 12 depicts an exemplary response to a social media post, which may be sent to a social media user.

In this regard, FIG. 11 depicts an exemplary response 1100 when the entity has been determined to be the company representative 170. In the illustrated example, the response comprises complaint report 1110 including summary 1120, which states: "Customer John Doe has complained on social media site XYZ about product ABC."

The social media user 190 may use social media user computing device 195 (e.g., to review and/or respond to a response sent to her by the chatbot 124). The social media user computing device 195 may be any suitable device, such as a computer, a smartphone, a laptop, a phablet, etc. It should be appreciated that the social media user computing device 195 may include one or more processors (e.g., one or more microprocessors, controllers, and/or any other suitable type of processor), one or more memories, one or more displays, etc.

FIG. 12 depicts an exemplary response 1200 when the entity has been determined to be the social media user 190. In the illustrated example, the exemplary response 1200 includes a company logo 1210 and text 1220.

The employee 198 may use employee computing device 199 (e.g., to review and/or respond to a response sent to her by the chatbot 124). The employee computing device 199 may be any suitable device, such as a computer, a smartphone, a laptop, a phablet, wearable, augmented reality glasses, smart glasses, virtual reality headset, etc. It should be appreciated that the employee computing device 199 may include one or more processors (e.g., one or more microprocessors, controllers, and/or any other suitable type of processor), one or more memories, one or more displays, etc.

Figure 13:
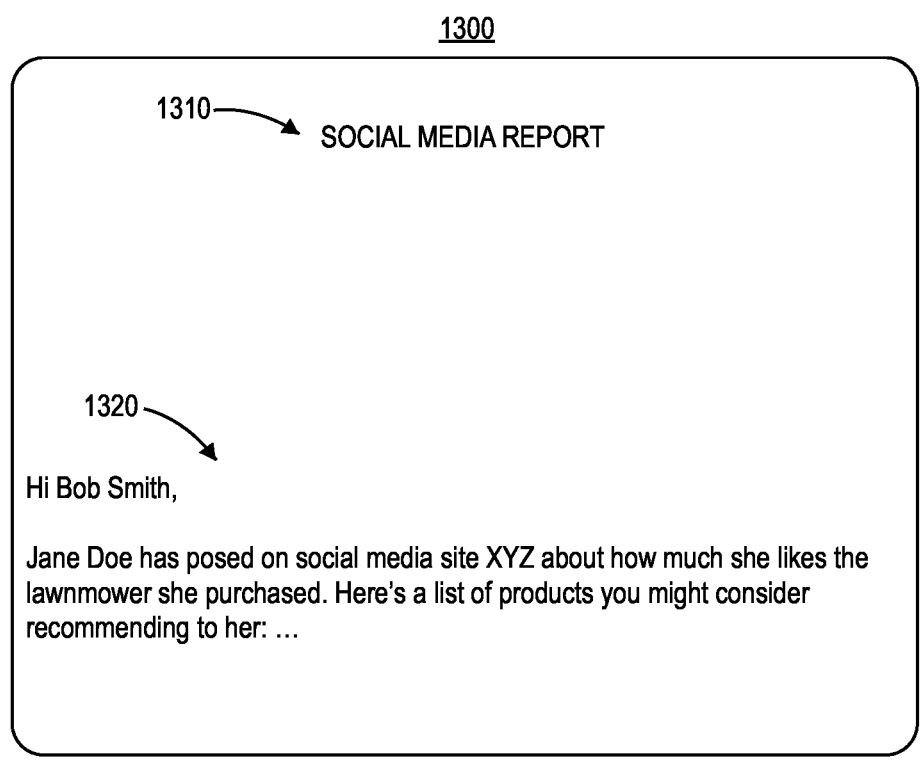
FIG. 13 depicts an exemplary response to a social media post, which may be sent to an employee.

FIG. 13 depicts an exemplary response 1300 when the entity has been determined to be the employee 198. In the illustrated example, the exemplary response 1300 comprises a social media report 1310 including text 1320.

In some specific examples, the company may be an insurance company, and the chatbot 124 may interact with the insurance agent 160. The insurance agent 160 may use insurance agent computing device 165 (e.g., to review and/or respond to a response sent to her by the chatbot 124). The insurance agent computing device 165 may be any suitable device, such as a computer, a smartphone, a laptop, a phablet, wearable, smart glasses, augmented reality glasses, virtual reality headset, etc. It should be appreciated that the insurance agent computing device 165 may include one or more processors (e.g., one or more microprocessors, controllers, and/or any other suitable type of processor), one or more memories, one or more displays, etc.

In some instances, the insurance customer 150 may make the social media post. The insurance customer 150 may use insurance customer computing device 155 to make and/or post the social media post. The insurance customer computing device 155 may be any suitable device, such as a computer, a smartphone, a laptop, a phablet, wearable, smart glasses, augmented reality glasses, virtual reality headset, etc. It should be appreciated that the insurance customer computing device 155 may include one or more processors (e.g., one or more microprocessors, controllers, and/or any other suitable type of processor), one or more memories, one or more displays, etc.

In some implementations, the social media reviewing computing device 102 may store information on the internal database 118. Examples of the information stored include social media posts, conversations with the chatbot 124, etc.

Furthermore, it should be appreciated that the social media posts may be made via the social media company 101, which may comprise servers (e.g., including processors, such as one or more microprocessors, controllers, and/or any other suitable type of processor), memories, etc.), display devices, etc.

In addition, further regarding the exemplary system 100, the illustrated exemplary components may be configured to communicate, e.g., via the network 104 (which may be a wired or wireless network, such as the internet), with any other component. Furthermore, although the exemplary system 100 illustrates only one of each of the components, any number of the example components are contemplated (e.g., any number of social media reviewing computing devices, social media companies, company representative computing devices, insurance agent computing devices, insurance customer computing devices, social media user computing devices, employee computing devices, external databases, etc.).

Exemplary Training of an Exemplary Chatbot

The chatbot 124 may, inter alia, determine and/or provide responses to social media posts, and/or converse with users. The chatbot 124 may be capable of understanding requests, providing relevant information, escalating issues. Additionally, the chatbot 124 may generate data from interactions which the enterprise may use to personalize future support and/or improve the chatbot's functionality, e.g., when retraining and/or fine-tuning the chatbot. Moreover, although the following discussion may refer to an ML chatbot or an ML model, it should be understood that it applies equally to an AI chatbot or an AI model. In addition, the following discussion applies equally to a voicebot.

The chatbot 124 may be trained by chatbot training application 126 using large training datasets of text which may provide sophisticated capability for natural-language tasks, such as answering questions and/or holding conversations. The chatbot 124 may include a general-purpose pretrained LLM which, when provided with a starting set of words (prompt) as an input, may attempt to provide an output (response) of the most likely set of words that follow from the input. In one aspect, the prompt may be provided to, and/or the response received from, the chatbot 124 and/or any other ML model, via a user interface of the social media reviewing computing device 102. This may include a user interface device operably connected to the server via an I/O module. Exemplary user interface devices may include a touchscreen, a keyboard, a mouse, a microphone, a speaker, a display, and/or any other suitable user interface devices.

Multi-turn (i.e., back-and-forth) conversations may require LLMs to maintain context and coherence across multiple user utterances, which may require the chatbot 124 to keep track of an entire conversation history as well as the current state of the conversation. The chatbot 124 may rely on various techniques to engage in conversations with users, which may include the use of short-term and long-term memory. Short-term memory may temporarily store information (e.g., in the memory 122 of the social media reviewing computing device 102) that may be required for immediate use and may keep track of the current state of the conversation and/or to understand the user's latest input in order to generate an appropriate response. Long-term memory may include persistent storage of information (e.g., the internal database 118 of the social media reviewing computing device 102) which may be accessed over an extended period of time. The long-term memory may be used by the chatbot 124 to store information about the user (e.g., preferences, chat history, etc.) and may be useful for improving an overall user experience by enabling the chatbot 124 to personalize and/or provide more informed responses.

In some embodiments, the system and methods to generate and/or train an ML chatbot model (e.g., via the chatbot training application 126) which may be used in the chatbot 124, may include three steps: (1) a supervised fine-tuning (SFT) step where a pretrained language model (e.g., an LLM) may be fine-tuned on a relatively small amount of demonstration data curated by human labelers to learn a supervised policy (SFT ML model) which may generate responses/outputs from a selected list of prompts/inputs. The SFT ML model may represent a cursory model for what may be later developed and/or configured as the ML chatbot model; (2) a reward model step where human labelers may rank numerous SFT ML model responses to evaluate the responses which best mimic preferred human responses, thereby generating comparison data. The reward model may be trained on the comparison data; and/or (3) a policy optimization step in which the reward model may further fine-tune and improve the SFT ML model. The outcome of this step may be the ML chatbot model using an optimized policy. In one aspect, step one may take place only once, while steps two and three may be iterated continuously, e.g., more comparison data is collected on the current ML chatbot model, which may be used to optimize/update the reward model and/or further optimize/update the policy.

Supervised Fine-Tuning ML Model

Figure 2:
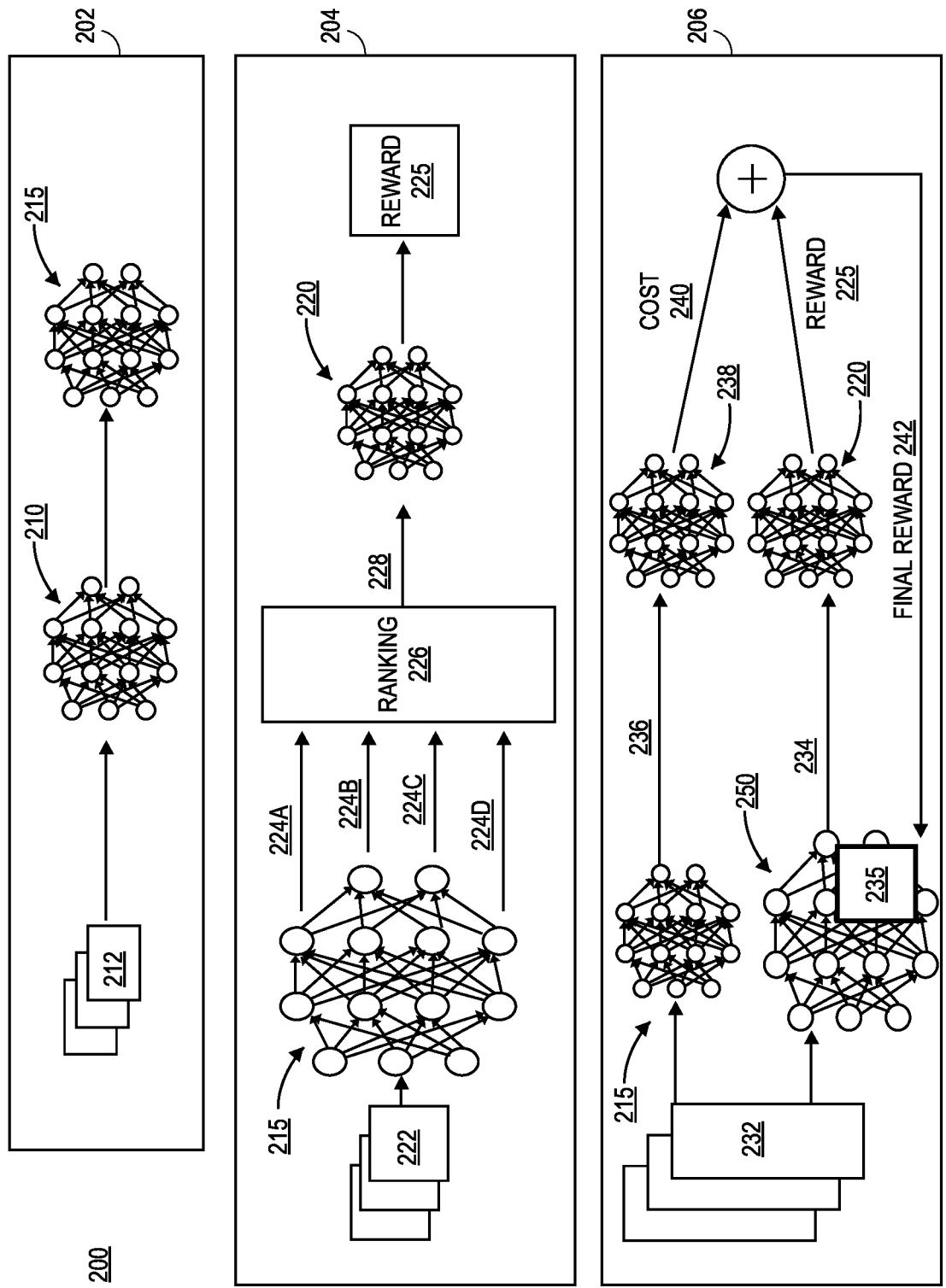
FIG. 2 depicts an exemplary combined block and logic diagram for exemplary training of an exemplary chatbot.

As an initial matter, although the discussion with respect to FIG. 2 refers to ML model 250, it should be understood that 250 may refer equally to an AI and/or ML algorithm and/or model.

FIG. 2 depicts a combined block and logic diagram 200 for training an ML chatbot model, in which the techniques described herein may be implemented, according to some embodiments. It should be understood that FIG. 2 may apply to training any chatbot described herein, and FIG. 2 should not be considered to be restricted to the chatbot 124. In addition, the chatbot 124 may be trained in accordance with any of the other techniques described herein; and the training of chatbot 124 should not be considered restricted to the teachings of FIG. 2.

Some of the blocks in FIG. 2 may represent hardware and/or software components, other blocks may represent data structures or memory storing these data structures, registers, or state variables (e.g., 212), and other blocks may represent output data (e.g., 225). Input and/or output signals may be represented by arrows labeled with corresponding signal names and/or other identifiers. The methods and systems may include one or more blocks 202, 204, 206, which will be described in further detail below.

In one aspect, at block 202, a pretrained language model 210 may be fine-tuned. The pretrained language model 210 may be obtained at block 202 and be stored in a memory, such as memory 122 and/or internal database 118. The pretrained language model 210 may be loaded into an ML training module at block 202 for retraining/fine-tuning. A supervised training dataset 212 may be used to fine-tune the pretrained language model 210 wherein each data input prompt to the pretrained language model 210 may have a known output response for the pretrained language model 210 to learn from. The supervised training dataset 212 may be stored in a memory at block 202, e.g., the memory 122 and/or the internal database 118. In one aspect, the data labelers may create the supervised training dataset 212 prompts and appropriate responses. The pretrained language model 210 may be fine-tuned using the supervised training dataset 212 resulting in the SFT ML model 215 which may provide appropriate responses to user prompts once trained. The trained SFT ML model 215 may be stored in a memory, such as the memory 122 and/or the internal database 118.

In one aspect, the supervised training dataset 212 may include prompts and responses. In some examples, the prompts and responses comprise social media posts, and responses to the social media posts (e.g., historical social media posts, and historical responses to the historical social media posts). In some embodiments, the supervised training dataset 212 may further include historical insurance customer profiles associated with the historical social media posts, and the historical insurance customer profiles may include information of historical homeowners insurance policies, historical renters insurance policies, historical auto insurance policies, historical life insurance policies, and/or historical disability insurance policies of historical insurance customers. In this way, the chatbot 124 may "learn" how an insurance customer profile should influence how the response to the social media post should be built.

In some embodiments, the prompts and/or responses may include tags indicating how to categorize the prompts (e.g., the social media posts) and/or responses. The types of categories that the social media posts may be categorized into are discussed elsewhere herein. For example, if the exemplary social media post 500 is used as a prompt, it may have a corresponding tag indicating a category of customer complaint about a company. In this way, the chatbot 124 may "learn" how to categorize social media posts.

The prompts and responses may also train the chatbot 124 to generate responses for specific entity. For example, one prompt may have multiple responses (e.g., responses for different entities). In one such example, the exemplary social media post 800 may have multiple responses, such as exemplary response 1200 (e.g., for the social media user 190), and exemplary response 1300 (e.g., for the employee 198). In this way, and as will be seen with respect to FIG.

14, the chatbot 124 may be trained to generate multiple responses (e.g., a first response, a second response, and so on).

The prompts and responses may also effectively train the chatbot 124 to use summaries of and/or quotations from the social media posts in the responses that it builds. For instance, the responses in the supervised training dataset 212 may include summaries of and/or quotations from the prompts in the supervised training dataset 212.

Training the Reward Model

In one aspect, training the ML chatbot model 250 may include, at block 204, training a reward model 220 to provide as an output a scaler value/reward 225. The reward model 220 may be required to leverage Reinforcement Learning with Human Feedback (RLHF) in which a model (e.g., ML chatbot model 250) learns to produce outputs which maximize its reward 225, and in doing so may provide responses which are better aligned to user prompts.

Training the reward model 220 may include, at block 204, providing a single prompt 222 to the SFT ML model 215 as an input. The input prompt 222 may be provided via an input device (e.g., a keyboard) of the social media reviewing computing device 102. The prompt 222 may be previously unknown to the SFT ML model 215, e.g., the labelers may generate new prompt data, the prompt 222 may include testing data stored on internal database 118, and/or any other suitable prompt data. The SFT ML model 215 may generate multiple, different output responses 224A, 224B, 224C, 224D to the single prompt 222. At block 204, the social media reviewing computing device 102 (and/or the insurance customer computing device 155, insurance agent computing device 165, etc.) may output the responses 224A, 224B, 224C, 224D via any suitable technique, such as outputting via a display (e.g., as text responses), a speaker (e.g., as audio/voice responses), etc., for review and/or rank by the data labelers.

In one example, a data labeler may provide, to the SFT ML model 215, a social media post as an input prompt 222. The input may be provided by the labeler (e.g., via the social media reviewing computing device 102, etc.) to the social media reviewing computing device 102 running chatbot 124 utilizing the SFT ML model 215. The SFT ML model 215 may provide, as output responses to the labeler (e.g., via their respective devices), four different responses to the social media post 224A, 224B, 224C, 224D. The data labeler may rank 226, via labeling the prompt-response pairs, prompt-response pairs 222/224A, 222/224B, 222/224C, and 222/224D from most preferred to least preferred. The labeler may rank 226 the prompt-response pair data in any suitable manner. The ranked prompt-response pairs 228 may be provided to the reward model 220 to generate the scalar reward 225. It should be appreciated that this facilitates training the chatbot 124 to determine responses corresponding to social media posts.

The data labelers may provide feedback (e.g., via the social media reviewing computing device 102, etc.) on the responses 224A, 224B, 224C, 224D when ranking 226 them from best to worst based upon the prompt-response pairs. The data labelers may rank 226 the responses 224A, 224B, 224C, 224D by labeling the associated data. The ranked prompt-response pairs 228 may be used to train the reward model 220. In one aspect, the social media reviewing computing device 102 may load the reward model 220 via the chatbot training application 126 and train the reward model 220 using the ranked response pairs 228 as input. The reward model 220 may provide as an output the scalar reward 225.

In one aspect, the scalar reward 225 may include a value numerically representing a human preference for the best and/or most expected response to a prompt, i.e., a higher scaler reward value may indicate the user is more likely to prefer that response, and a lower scalar reward may indicate that the user is less likely to prefer that response. For example, inputting the "winning" prompt-response (i.e., input-output) pair data to the reward model 220 may generate a winning reward. Inputting a "losing" prompt-response pair data to the same reward model 220 may generate a losing reward. The reward model 220 and/or scalar reward 236 may be updated based upon labelers ranking 226 additional prompt-response pairs generated in response to additional prompts 222.

While the reward model 220 may provide the scalar reward 225 as an output, the reward model 220 may not generate a response (e.g., text). Rather, the scalar reward 225 may be used by a version of the SFT ML model 215 to generate more accurate responses to prompts, i.e., the SFT model 215 may generate the response such as text to the prompt, and the reward model 220 may receive the response to generate a scalar reward 225 of how well humans perceive it. Reinforcement learning may optimize the SFT model 215 with respect to the reward model 220, which may realize the configured ML chatbot model 250.

RLHF to Train the ML Chatbot Model

In one aspect, the social media reviewing computing device 102 may train the ML chatbot model 250 (e.g., via the chatbot training application 126) to generate a response 234 to a random, new and/or previously unknown user prompt 232. To generate the response 234, the ML chatbot model 250 may use a policy 235 (e.g., algorithm) which it learns during training of the reward model 220, and in doing so may advance from the SFT model 215 to the ML chatbot model 250. The policy 235 may represent a strategy that the ML chatbot model 250 learns to maximize its reward 225. As discussed herein, based upon prompt-response pairs, a human labeler may continuously provide feedback to assist in determining how well the ML chatbot's 250 responses match expected responses to determine rewards 225. The rewards 225 may feed back into the ML chatbot model 250 to evolve the policy 235. Thus, the policy 235 may adjust the parameters of the ML chatbot model 250 based upon the rewards 225 it receives for generating good responses. The policy 235 may update as the ML chatbot model 250 provides responses 234 to additional prompts 232.

In one aspect, the response 234 of the ML chatbot model 250 using the policy 235 based upon the reward 225 may be compared using a cost function 238 to the SFT ML model 215 (which may not use a policy) response 236 of the same prompt 232. The server 206 may compute a cost 240 based upon the cost function 238 of the responses 234, 236. The cost 240 may reduce the distance between the responses 234, 236, i.e., a statistical distance measuring how one probability distribution is different from a second, in one aspect the response 234 of the ML chatbot model 250 versus the response 236 of the SFT model 215. Using the cost 240 to reduce the distance between the responses 234, 236 may avoid a server over-optimizing the reward model 220 and deviating too drastically from the human-intended/preferred response. Without the cost 240, the ML chatbot model 250 optimizations may result in generating responses 234 which are unreasonable but may still result in the reward model 220 outputting a high reward 225.

In one aspect, the responses 234 of the ML chatbot model 250 using the current policy 235 may be passed by the server 206 to the rewards model 220, which may return the scalar reward or discount 225. The ML chatbot model 250 response 234 may be compared via cost function 238 to the SFT ML model 215 response 236 by the server 206 to compute the cost 240. The server 206 may generate a final reward 242 which may include the scalar reward 225 offset and/or restricted by the cost 240. The final reward or discount 242 may be provided by the server 206 to the ML chatbot model 250 and may update the policy 235, which in turn may improve the functionality of the ML chatbot model 250.

To optimize the ML chatbot model 250 over time, RLHF via the human labeler feedback may continue ranking 226 responses of the ML chatbot model 250 versus outputs of earlier/other versions of the SFT ML model 215, i.e., providing positive or negative rewards 225. The RLHF may allow the chatbot training application 126 to continue iteratively updating the reward model 220 and/or the policy 235. As a result, the ML chatbot model 250 may be retrained and/or fine-tuned based upon the human feedback via the RLHF process, and throughout continuing conversations may become increasingly efficient.

Although multiple blocks 202, 204, 206 are depicted in the exemplary block and logic diagram 200, each providing one of the three steps of the overall ML chatbot model 250 training, fewer and/or additional servers may be utilized and/or may provide the one or more steps of the chatbot 124 training. In one aspect, one server may provide the entire ML chatbot model 250 training.

Figure 14:
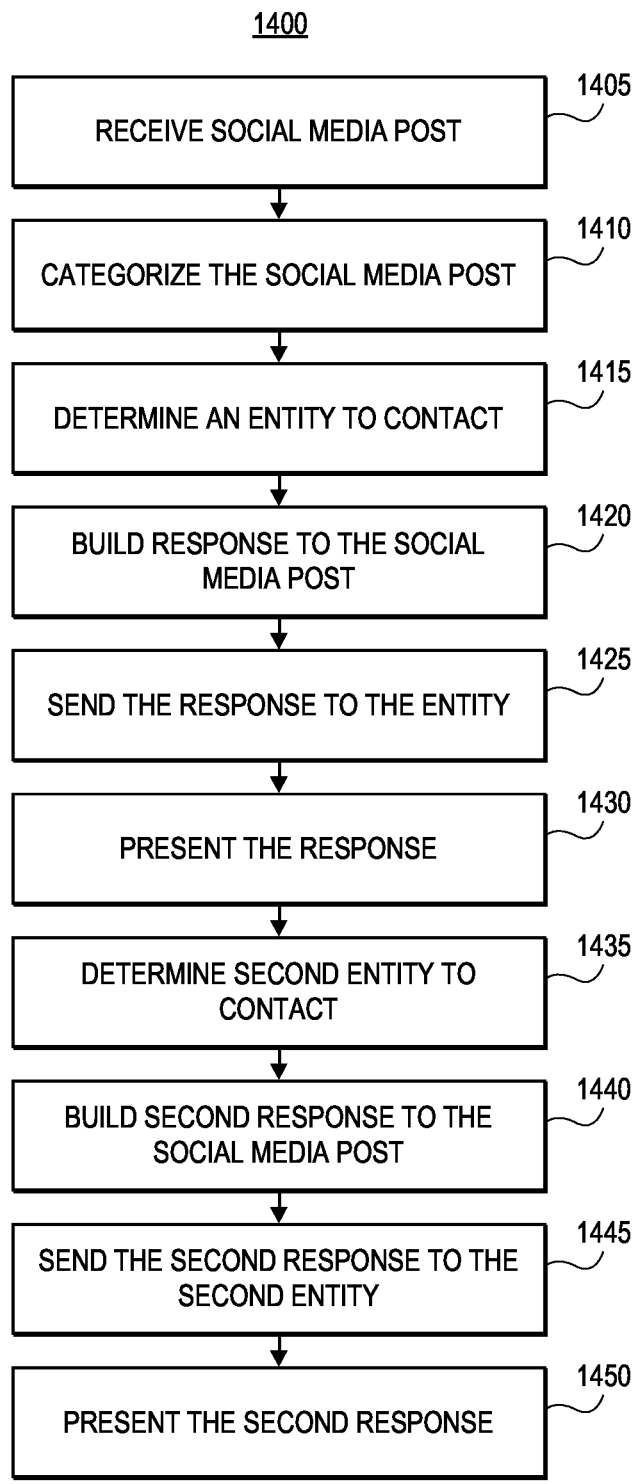
FIG. 14 depicts an exemplary computer-implemented method or implementation for AI-based responding to social media posts.

Exemplary Computer-Implemented Methods—AI-Based Responding to Social Media Posts FIG. 14 shows an exemplary computer-implemented method or implementation 1400 for AI-based responding to social media posts. Although the following discussion refers to the exemplary method or implementation 1400 as being performed by the one or more processors 120, it should be understood that any or all of the blocks may be alternatively or additionally performed by any other suitable component as well (e.g., one or more processors of the social media company 101, one or more processors of the company representative computing device 175, one or more processors of the social media user computing device 195, one or more processors of the employee computing device 199, one or more processors of the insurance customer computing device 155, one or more processors of the insurance agent computing device 165, etc.).

The exemplary implementation 1400 may begin at block 1405 when the one or more processors 120 (e.g., via the chatbot 124) receive a social media post. Example social media posts are depicted in FIGS. 5-10. The social media post may be received from any suitable source. For example, the social media post may be received from the social media company 101. In another example, the social media post may be received from the external database 180; for instance, the external database 180 may be an aggregator database that aggregates social media posts from different social media companies.

At block 1410, the one or more processors 120 (e.g., via the chatbot 124) may categorize the social media post. Examples of categories include: (i) customer complaint about a company; (ii) customer complaint about a product and/or service; (iii) customer praise of the company; (iv) customer praise of the product and/or service; (v) employee complaint about the company; (vi) employee praise of the company; etc. FIGS. 5-10 show examples social media posts corresponding to the categories, and are discussed elsewhere herein.

The categorization at block 1410 may be done by any suitable technique. For example, the chatbot 124 may use what it "learned" during training (e.g., as described with respect to FIG. 2, etc.). For instance, the tags in the training data may have "taught" the chatbot 124 how to categorize the social media posts.

At block 1415, the one or more processors 120 (e.g., via the chatbot 124) may determine an entity to contact. Examples of the entity to contact include: the company representative 170; the social media user 190 (e.g., a social media user who posted a review of a product and/or company); the employee 198 (e.g., an employee of the company who posted about the company, or who is being contacted because of a social media post about another social media user); and the insurance agent 160.

The determination at block 1415 may be done by any suitable technique. For example, the determination may be based upon the categorization of the social media post. For instance, if the category of the social media post is determined to be the customer complaint about the company or the customer complaint about a product and/or service, the entity to contact may be determined to be the company representative 170. In this regard, here, having the chatbot 124 contact the company representative 170 advantageously allows the company representative 170 to respond to the customer complaint about the about the company or the product and/or service.

In some examples, if the category of the social media post is determined to be the customer praise of the company or the customer praise of the product and/or service, the entity to contact may be determined to be the social media user 190. Advantageously, this may allow the company to capitalize on a product and/or service that the company has provided to the social media user 190.

Additionally or alternatively, if the category of the social media post is determined to be the customer praise of the company or the customer praise of the product and/or service, the entity to contact may be determined to be the employee 198 and/or the insurance agent 160. Advantageously, this prompts the employee 198 and/or the insurance agent 160 to contact the person who posed the social media post (e.g., to ask the person to write a review of the company, or to provide the person with a list of suggested products and/or services to purchase).

In some examples, if the category of the social media post is determined to be the employee complaint about the company or the employee praise of the company, the entity to contact may be determined to be the company representative 170. Advantageously, this makes the company representative 170 aware of the social media post, and facilitates the company representative 170 approaching the employee 198 about the social media post.

Additionally or alternatively, the determination at block 1415 may include determining a company referenced in the social media post, and/or determining the entity to contact to be a representative 170 of the determined company. For example, the social media reviewing computing device 102 may be scanning all social media posts generally, and matching the social media posts with companies facilitates the determination of what entity to contact regarding the social media post.

The company may be determined by any suitable technique. For example, if a company name found in the social media post may be used to determine the company. In another example, the chatbot 124 may determine the company based upon: the company name being in a social media post, and/or a name of a particular product and/or service that the company provides also being in the social media post. In yet another example, the chatbot 124 may use an image recognition algorithm to find a company logo (e.g., 510 of the example of FIG. 5), and determine the company based upon the company logo.

In some embodiments, upon determination of the company, the chatbot 124 may determine the entity to contact to be a company representative 170 of the determined company.

At block 1420, the one or more processors 120 (e.g., via the chatbot 124) may build a response to the social media post. In some examples, because the chatbot 124 has been trained as discussed herein (e.g., according to the principles of FIG. 2, etc.), it is able to build the response based upon the social media post.

In some examples, the built response includes a summary of the social media post and/or a quotation from the social media post.

In certain examples, the built response includes: (i) a request that the user post a review of the company, product, and/or service, and/or (ii) a recommendation to purchase an additional product and/or service (e.g., as in the example of FIG. 12).

In some examples, the built response includes a list of one or more products and/or services for the employee to suggest to a user who posted the social media post (e.g., as in the example of FIG. 13).

In some examples where the entity to contact is the insurance agent 160, the built response may include a recommendation to purchase a product including a homeowners insurance policy, a renters insurance policy, an auto insurance policy, a life insurance policy and/or a disability insurance policy. In one example, the social media post may indicate that the social media user 190 is contemplating purchasing a new home, and the response to the social media post recommends that the social media user 190 contact the insurance agent 160 for a homeowners insurance quote. In another example, the social media post may indicate that the social media user 190 has just rented a new apartment, and the response to the social media post recommends that the social media user 190 purchase renters insurance. In another example, the social media post may indicate that the social media user 190 is contemplating purchasing a new vehicle, and the response to the social media post recommends that the social media user 190 contact the insurance agent 160 for an auto insurance quote. In another example, the social media post may indicate that the social media user 190 has just become engaged or married, and the response to the social media post recommends that the social media user 190 contact the insurance agent 160 for a life insurance quote. In another example, the social media post may indicate that the social media user 190 has just had a child, and the response to the social media post recommends that the social media user 190 contact the insurance agent 160 for a life insurance quote. In yet another example, the social media post may indicate that the social media user 190 is going through a divorce, and the response to the social media post recommends that the social media user 190 change the beneficiary on a life insurance policy.

Furthermore, in some examples, the responses may be built based upon additional information of the insurance customer 150 and/or social media user 190. For example, the responses may be built further based upon an insurance customer profile of the insurance customer 150 or social media user 190. The insurance customer profile may include information of the insurance customer's 150 or social media user's 190: homeowners insurance policy, renters insurance policy, auto insurance policy, life insurance policy, and/or disability insurance policy.

At block 1425, the one or more processors 120 (e.g., via the chatbot 124) may send the response to the entity (e.g., the entity determined at block 1415).

At block 1430, the response may be presented to the entity. In some examples, this includes displaying the response. For instance, the response may be displayed on a display of any of: the social media reviewing computing device 102, the social media company 101, the company representative computing device 175, the insurance agent computing device 165, the insurance customer computing device 155, the social media user computing device 195, and/or the employee computing device 199.

Additionally or alternatively, the response may be verbally or audibly presented (e.g., via any of: the social media reviewing computing device 102, the social media company 101, the company representative computing device 175, the insurance agent computing device 165, the insurance customer computing device 155, the social media user computing device 195, and/or the employee computing device 199).

At block 1435, the one or more processors 120 (e.g., via the chatbot 124) may determine a second entity to contact. Examples of the second entity to contact include: the company representative 170; the social media user 190 (e.g., a social media user who posted a review of a product and/or company); the employee 198 (e.g., an employee of the company who posted about the company, or who is being contacted because of a social media post about another user); and the insurance agent 160. It should be appreciated that in examples where a second entity is contacted, the entity to contact determined at block 1415 is a first entity.

The determination at block 1435 may be done by any suitable technique. For example, the determination may be made similarly to the determination of the first entity at block 1415, except the chatbot 124 may exclude the first entity from consideration. Advantageously, contacting two entities allows one or both of the entities to be aware that the chatbot 124 has contacted the other entity. For example, after sending a list of suggested products and/or services to the social media user 190, the chatbot 124 may send a response to the employee 198 (e.g., possibly a salesperson for the company) indicating that the social media user 190 has been contacted, which allows the employee 198 to follow up with the social media user 190 at a time of the employee's 198 choosing.

At block 1440, the one or more processors 120 (e.g., via the chatbot 124) may build a response (e.g., the response built at block 1440 is a second response, and the response built at block 1420 is a first response). The second response may be built similarly to the first response. For instance, in some examples, because the chatbot 124 has been trained as discussed herein (e.g., according to the principles of FIG. 2, etc.), it is able to build the second response based upon the social media post. Furthermore, in some examples, the second response includes contact information of the first entity. For example, if the first entity is the social media user 190 and the second entity is the employee 198, the second response may include the contact information (e.g., email address, phone number, etc.) of the social media user 190, thereby allowing the employee 198 to follow up with the social media user 190 (e.g., about suggested products or services that the company offers).

At block 1445, the one or more processors 120 (e.g., via the chatbot 124) may send the second response to the entity (e.g., the second entity determined at block 1435).

At block 1450, the second response may be presented to the second entity. In some examples, this includes displaying the second response. For instance, the second response may be displayed on a display of any of: the social media reviewing computing device 102, the social media company 101, the company representative computing device 175, the insurance agent computing device 165, the insurance customer computing device 155, the social media user computing device 195, and/or the employee computing device 199.

Additionally or alternatively, the second response may be verbally or audibly presented (e.g., via any of: the social media reviewing computing device 102, the social media company 101, the company representative computing device 175, the insurance agent computing device 165, the insurance customer computing device 155, the social media user computing device 195, and/or the employee computing device 199).

Moreover, although the exemplary method illustrates building and sending only two responses, the chatbot 124 may build and/or send any number of responses.

It should be understood that not all blocks and/or events of the exemplary signal diagrams and/or flowcharts are required to be performed. Moreover, the exemplary signal diagrams and/or flowcharts are not mutually exclusive (e.g., block(s)/events from each example signal diagram and/or flowchart may be performed in any other signal diagram and/or flowchart). The exemplary signal diagrams and/or flowcharts may include additional, less, or alternate functionality, including that discussed elsewhere herein.

Additional Exemplary Embodiments—AI-Based Responding to Social Media Posts

In one aspect, a computer-implemented method for responding to a social media post may be provided. The method may be implemented via one or more local or remote processors, sensors, transceivers, servers, memory units, augmented reality glasses or headsets, virtual reality headsets, extended or mixed reality headsets, smart glasses or watches, wearables, voice bot or chatbot, ChatGPT bot, and/or other electronic or electrical components. For instance, in one example, the method may include: (1) receiving, via a chatbot of one or more processors, a social media post; (2) categorizing, via the chatbot, the social media post; (3) determining, via the chatbot, based upon the categorization, an entity to contact; (4) building, via the chatbot, based upon the determined entity to contact, a response to the social media post; and/or (5) sending, via the chatbot, the response to the entity. The method may include additional, fewer, or alternate actions, including those discussed elsewhere herein.

In some embodiments, the categorizing comprises determining a category of the social media post, the category comprising (i) customer complaint about a company; (ii) customer complaint about a product and/or service; (iii) customer praise of the company; (iv) customer praise of the product and/or service; (v) employee complaint about the company; or (vi) employee praise of the company.

In some embodiments, the categorizing comprises determining the category of the social media post to be (i) the customer complaint about the company or (ii) the customer complaint about a product and/or service; and/or in response to the determining the category of the social media post to be (i) the customer complaint about the company or (ii) the customer complaint about a product and/or service: determining the entity to contact comprises determining the entity to be a representative of the company; and/or the building the response comprises building the response to include a summary of the social media post and/or a quotation from the social media post.

In some embodiments, the categorizing comprises determining the category of the social media post to be (iii) the customer praise of the company or (iv) the customer praise of the product and/or service; and/or in response to the determining the category of the social media post to be (iii) the customer praise of the company or (iv) the customer praise of the product and/or service: the determining the entity to contact comprises determining the entity to be a user who posted the social media post; and/or the building the response comprises building the response to include: (i) a request that the user who posted a review of the company, product, and/or service, and/or (ii) a recommendation to purchase an additional product and/or service.

In some embodiments, the user who posted the social media post is the social media user 190, the employee 198, the insurance customer 150, or the insurance agent 160.

In some embodiments, the entity is a first entity, and the response is a first response, and/or wherein: further in response to the determining the category of the social media post to be (iii) the customer praise of the company or (iv) the customer praise of the product and/or service, the method further comprises: determining, via the chatbot, a second entity to contact, wherein the second entity is a representative of the company; building, via the chatbot, based upon the determined second entity to contact, a second response to the social media post; and/or sending, via the chatbot, the second response to the second entity.

In some embodiments, the categorizing comprises determining the category of the social media post to be (iii) the customer praise of the company or (iv) the customer praise of the product and/or service; and/or in response to the determining the category of the social media post to be (iii) the customer praise of the company or (iv) the customer praise of the product and/or service: the determining the entity to contact comprises determining the entity to be an employee of the company; and/or the building the response comprises building the response to include a list of one or more products and/or services for the employee to suggest to a user who posted the social media post.

In some embodiments, the categorizing comprises determining the category of the social media post to be (v) the employee complaint about the company or (vi) the employee praise of the company; and/or in response to the determining the category of the social media post to be (v) the employee complaint about the company or (vi) the employee praise of the company, the determining the entity to contact comprises determining the entity to be a representative of the company.

In some embodiments, the determining the entity to contact further comprises determining a company referenced in the social media post, and determining the entity to be a representative of the company.

In certain embodiments, the method further includes training the chatbot with a historical dataset comprising: (i) historical social media posts, and/or (ii) historical responses to the historical social media posts.

In some embodiments, the chatbot includes: an artificial intelligence (AI) chatbot, a machine learning (ML) chatbot, a generative AI chatbot, a deep learning algorithm, a generative pre-trained transformer (GPT), and/or long-short-term-memory (LSTM).

In certain embodiments, the building the response includes building the response to include a recommendation to purchase a product including a homeowners insurance policy, a renters insurance policy, an auto insurance policy, a life insurance policy and/or a disability insurance policy.

In some embodiments, the chatbot is trained based upon: a historical dataset comprising: (i) historical social media posts, and/or (ii) historical responses to the historical social media posts; and/or historical insurance customer profiles associated with the historical social media posts, the historical insurance customer profiles including information of historical homeowners insurance policies, historical renters insurance policies, historical auto insurance policies, historical life insurance policies, and/or historical disability insurance policies of historical insurance customers.

In another aspect, a computer system configured for responding to a social media post may be provided. The computer system may include one or more local or remote processors, sensors, transceivers, servers, memory units, augmented reality glasses or headsets, virtual reality headsets, extended or mixed reality headsets, smart glasses or watches, wearables, voice bot or chatbot, ChatGPT bot, and/or other electronic or electrical components. For example, in one instance, the computer system may include one or more processors configured to: (1) receive, via a chatbot, a social media post; (2) categorize, via the chatbot, the social media post; (3) determine, via the chatbot, based upon the categorization, an entity to contact; (4) build, via the chatbot, based upon the determined entity to contact, a response to the social media post; and/or (5) send, via the chatbot, the response to the entity. The computer system may include additional, less, or alternate functionality, including that discussed elsewhere herein.

In some embodiments, the one or more processors are further configured to categorize the social media post by determining a category of the social media post, the category comprising (i) customer complaint about a company; (ii) customer complaint about a product and/or service; (iii) customer praise of the company; (iv) customer praise of the product and/or service; (v) employee complaint about the company; or (vi) employee praise of the company.

In some embodiments, the one or more processors are configured to determine the entity to contact by: determining a company referenced in the social media post; if the category is (i) the customer complaint about the company or (ii) the customer complaint about a product and/or service, determining the entity to be the company; and/or if the category (iii) the customer praise of the company or (iv) the customer praise of the product and/or service, determining the entity to be a user who posted the social media post.

In some embodiments, the computer system further comprises a display device, and/or wherein the one or more processors are further configured to display the response on the display device.

In yet another aspect, a computer device configured for responding to a social media post may be provided. The computer device may include one or more local or remote processors, sensors, transceivers, servers, memory units, augmented reality glasses or headsets, virtual reality headsets, extended or mixed reality headsets, smart glasses or watches, wearables, voice bot or chatbot, ChatGPT bot, and/or other electronic or electrical components. For instance, in one example, the computer device may include: one or more processors; and/or one or more memories coupled to the one or more processors. The one or more memories including computer executable instructions stored therein that, when executed by the one or more processors, may cause the one or more processors to: (1) receive, via a chatbot, a social media post; (2) categorize, via the chatbot, the social media post; (3) determine, via the chatbot, based upon the categorization, an entity to contact; (4) build, via the chatbot, based upon the determined entity to contact, a response to the social media post; and/or (5) send, via the chatbot, the response to the entity. The computer device may include additional, less, or alternate functionality, including that discussed elsewhere herein.

In some embodiments, the one or more memories having stored thereon computer executable instructions that, when executed by the one or more processors, cause the one or more processors to categorize the social media post by determining a category of the social media post, the category comprising (i) customer complaint about a company; (ii) customer complaint about a product and/or service; (iii) customer praise of the company; (iv) customer praise of the product and/or service; (v) employee complaint about the company; or (vi) employee praise of the company.

In some embodiments, the one or more memories having stored thereon computer executable instructions that, when executed by the one or more processors, cause the one or more processors to determine the entity to contact by: determining a company referenced in the social media post; and/or if the category is (v) the employee complaint about the company or (vi) the employee praise of the company, determining the entity to be a representative of the company.

In some embodiments, the one or more memories having stored thereon computer executable instructions that, when executed by the one or more processors, cause the one or more processors to control a display device to display the response.

Exemplary System—AI-Based Reviewing Insurance Claims Complaints

The present embodiments also relate to, inter alia, AI-based review of insurance claims complaints. For example, a chatbot may review insurance claims complaints, and identify top reasons for complaints so that they may be addressed. Complaints may be sorted into different categories. Example categories include: a "tone" category (e.g., claims adjuster was rude to insurance customer, claims adjuster took too long to respond to insurance customer's voicemail messages, etc.) (e.g., a "non-policy" category); and a "policy" category (e.g., insurance policy didn't cover the damage to my roof, etc.). Complaints may also be categorized based on the type of insurance policy claim. The chatbot may also find trends in complaints. The chatbot may also analyze if complaining insurance customer left the insurance company during a time period following the complaint. The chatbot may also conduct and/or monitor internet searches, emails, etc. to find customer complaints. Chatbot may assemble an aggregated report (e.g., a table) of complaint information. The complaint report may be automatically sent to customer service to act.

Figure 3:
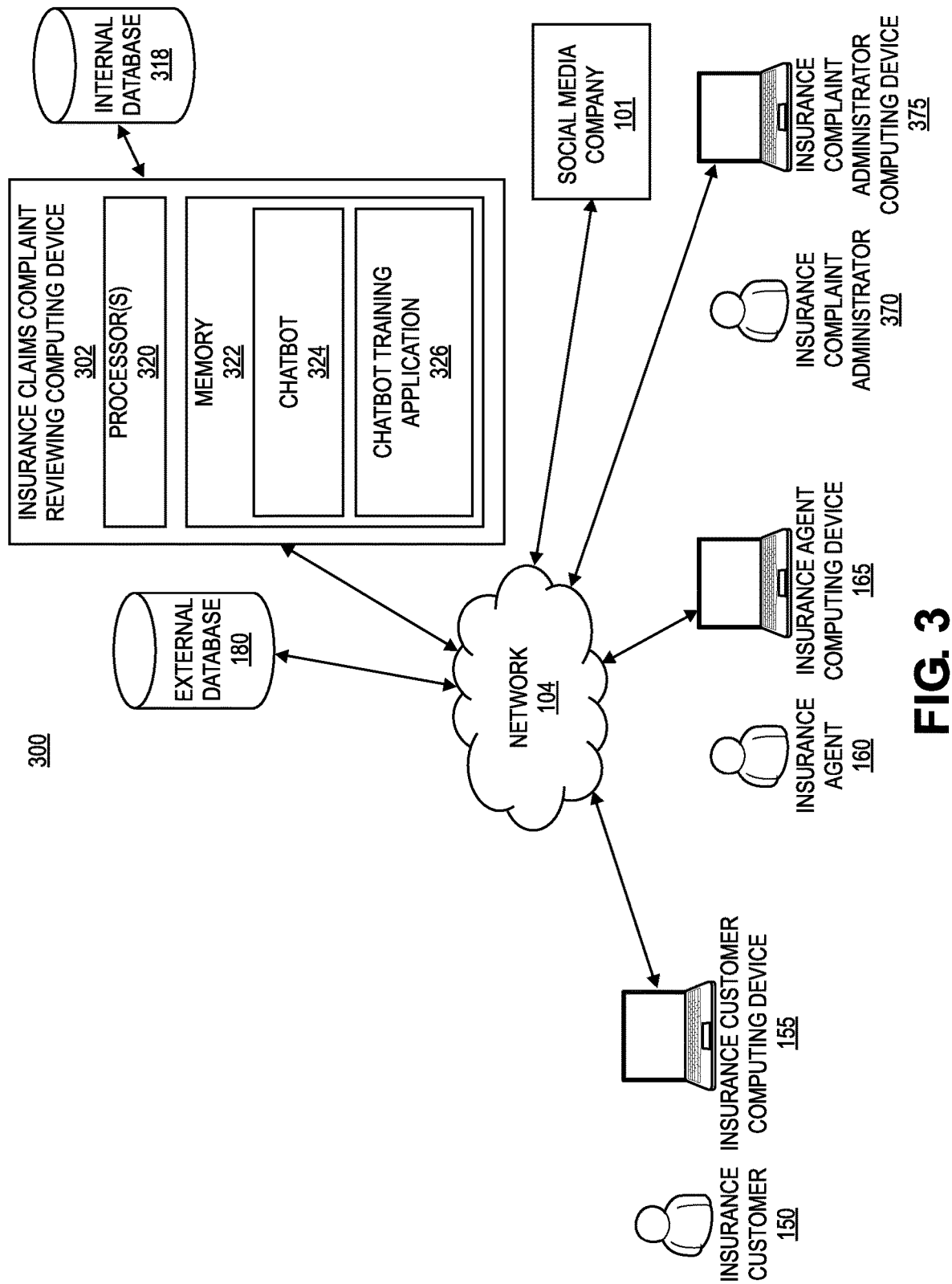
FIG. 3 illustrates an exemplary computer system for reviewing insurance claims complaints, according to one embodiment.

To this end, FIG. 3 illustrates an exemplary computer system 300 for reviewing insurance claims complaints in which the exemplary computer-implemented methods described herein may be implemented. The high-level architecture includes both hardware and software applications, as well as various data communications channels for communicating data between the various hardware and software components.

The exemplary system 300 may include insurance claims complaint reviewing computing device 302, which may include one or more processors 320, such as one or more microprocessors, controllers, and/or any other suitable type of processor. The insurance claims complaint reviewing computing device 302 may further include a memory 322 (e.g., volatile memory, non-volatile memory) accessible by the one or more processors 320, (e.g., via a memory controller). The one or more processors 320 may interact with the memory 322 to obtain and execute, for example, computer-readable instructions stored in the memory 322.

Additionally or alternatively, computer-readable instructions may be stored on one or more removable media (e.g., a compact disc, a digital versatile disc, removable flash memory, etc.) that may be coupled to the insurance claims complaint reviewing computing device 302 to provide access to the computer-readable instructions stored thereon. In particular, the computer-readable instructions stored on the memory 322 may include instructions for executing various applications, such as chatbot 324 (which may additionally or alternatively be voicebot 324), and/or chatbot training application 326. It should be understood that although 324 is labeled as chatbot, 324 may additionally or alternatively be a voicebot. It should further be understood that chatbot/voicebot 324 may be an AI and/or ML chatbot/voicebot.

In operation, the chatbot 324 may, inter alia, receive an insurance claim complaint (e.g., from the insurance customer computing device 155, the insurance agent computing device 165, the social media company 101, the external database 180, a website that posts insurance claims complaints, etc.). The chatbot 324 may then categorize the insurance claim complaint (e.g., into a tone category or a policy category, as are discussed elsewhere herein). The chatbot 324 may then build and/or send a complaint report based upon the insurance claim complaint, and/or the insurance claim complaint combined with other insurance claims complaints.

FIG. 15 illustrates an exemplary insurance claim complaint 1500. The exemplary insurance claim complaint 1500 may include insurance claim information 1510, which may include a name of the insurance customer (e.g., the customer submitting the insurance claim complaint), an insurance policy number corresponding to the insurance claim complaint, a date of the insurance claim, a date of the insurance claim complaint (e.g., a date that the insurance claim complaint was submitted), insurance claim details (e.g., which may be displayed in the insurance claim complaint 1500 or linked to from the insurance claim complaint 1500). The exemplary insurance claim complaint 1500 may further include text of the insurance claim complaint 1520.

The chatbot 324 may use an insurance claim complaint, such as the exemplary insurance claim complaint 1500 to build a complaint report, such as the exemplary complaint report 1600 of FIG. 16. The exemplary complaint report 1600 includes category 1605, which, in the exemplary report 1600, is the tone category. The exemplary complaint report 1600 further includes information of the insurance claim complaint 1660, such as insurance claim information 1610, a summary of the insurance claim complaint 1620, the text of the insurance claim complaint 1630, a quotation from correspondence between insurance customer and claims adjuster 1640, and a quotation from correspondence between insurance customer and insurance agent 1650.

Figure 17:
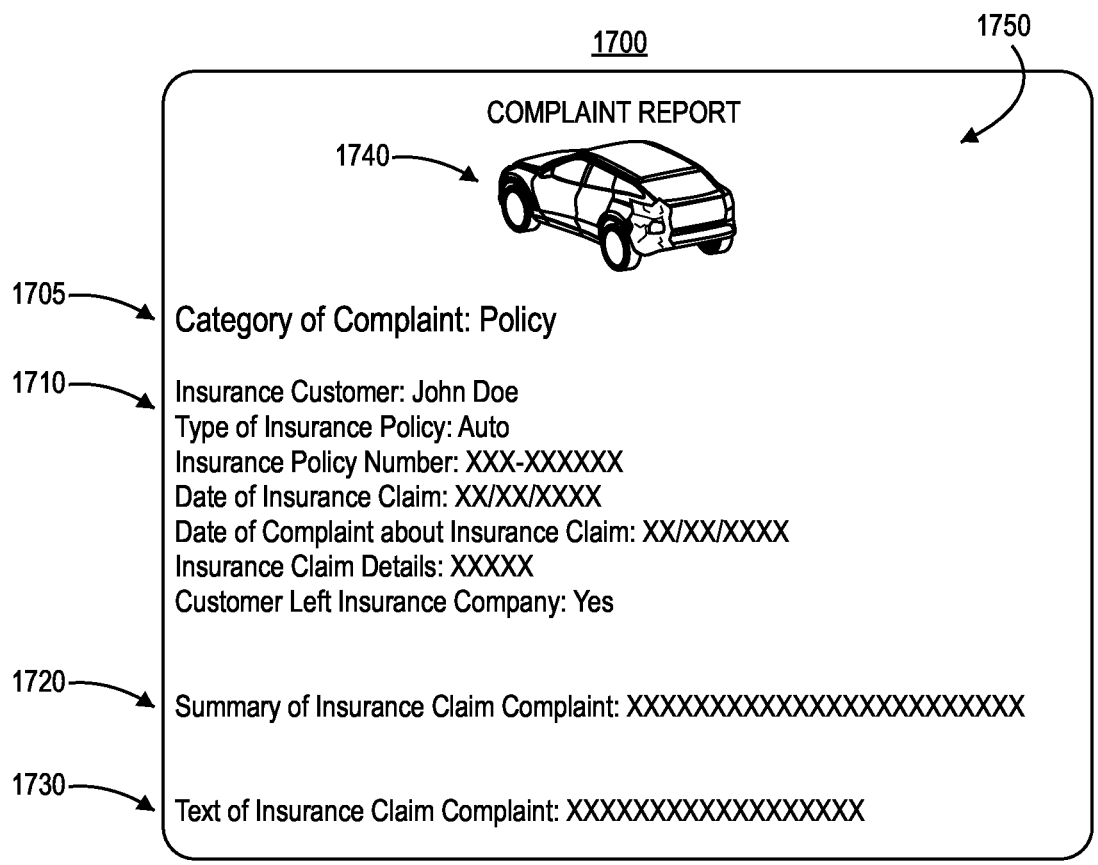
FIG. 17 depicts an exemplary complaint report of an exemplary policy category complaint.

FIG. 17 depicts an exemplary complaint report 1700 for an insurance claim complaint having a policy category. The exemplary complaint report 1700 may include category 1705, and information of the insurance claim complaint 1750, such as insurance claim information 1710, a summary of the insurance claim complaint 1720, the text of the insurance claim complaint 1730, and image of insured item 1740. The differences between the tone and policy categories are discussed elsewhere herein.

Figure 18:
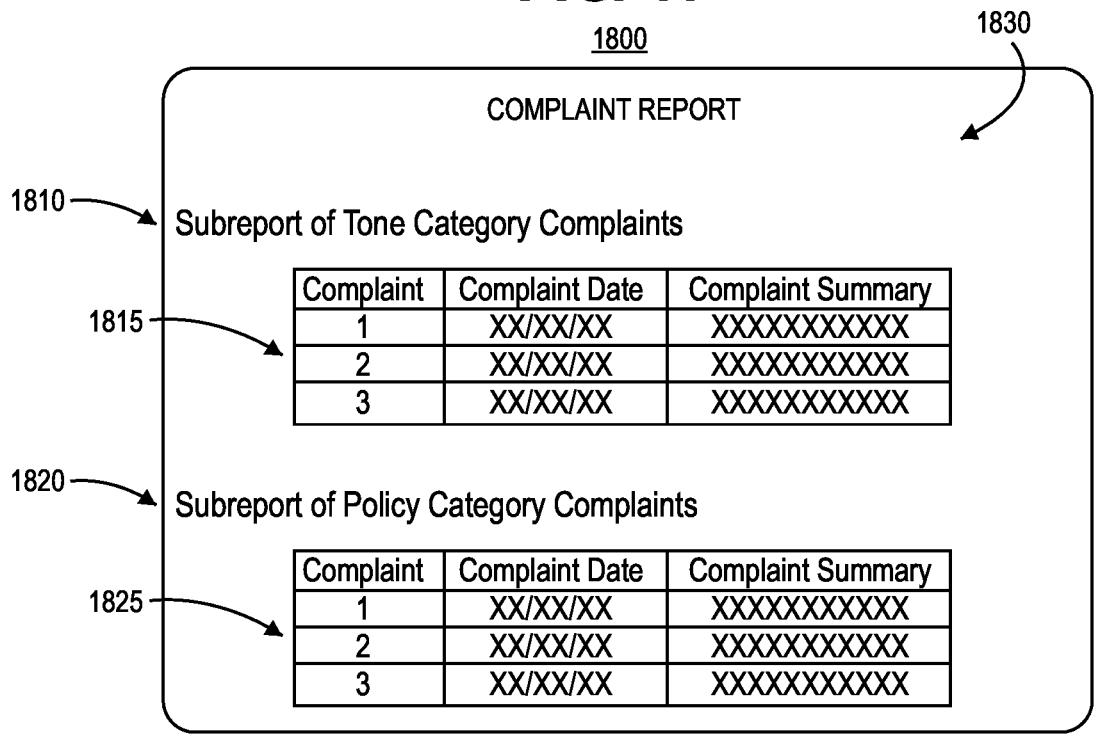
FIG. 18 depicts an exemplary complaint report including subreports of tone category complaints and policy category complaints.

The chatbot 324 may also build the complaint report to include subreports and/or tables, and FIG. 18 illustrates such an example. Specifically, FIG. 18 illustrates exemplary complaint report 1800 including insurance claim complaint information 1830, such as: (i) subreport of tone category complaints 1810 including table 1815; and (ii) subreport of policy category complaints 1820 including table 1825. It should be appreciated that the complaint report 1800 is only an example, and the subreports do not necessarily have to include tables.

The chatbot 324 may also build the complaint report to include a table of complaint reports, with the table indicating categories of complaint reports. In this regard, FIG. 19 illustrates exemplary complaint report 1900 including table 1910 (e.g., insurance claim complaint information) with indications of the complaint type 1920 and indications of the complaint subtype 1930.

In some instances, the insurance customer 150 may make the complaint via the insurance customer computing device 155. The insurance customer computing device 155 may be any suitable device, such as a computer, a smartphone, a laptop, a phablet, etc. It should be appreciated that the insurance customer computing device 155 may include one or more processors (e.g., one or more microprocessors, controllers, and/or any other suitable type of processor), one or more memories, one or more displays, etc.

In some instances, the insurance customer 150 may make the complaint through the insurance agent 160. For example, the insurance customer 150 may orally communicate the complaint to the insurance agent 160 while the insurance customer 150 is at the insurance agent's 160 office. In another example, the insurance customer 150 may email or otherwise electronically communicate the complaint to the insurance agent 160. As these examples illustrate, in some instances, the insurance agent 160 (e.g., via the insurance agent computing device 165) may send the complaint to the chatbot 324.

The insurance agent computing device 165 may be any suitable device, such as a computer, a smartphone, a laptop, a phablet, etc. It should be appreciated that the insurance agent computing device 165 may include one or more processors (e.g., one or more microprocessors, controllers, and/or any other suitable type of processor), one or more memories, one or more displays, etc.

Once built, in some examples, the complaint report may be sent (e.g., from the insurance claims complaint reviewing computing device 302) to the insurance complaint administrator 370 (e.g., via the insurance complaint administrator computing device 375). It should be appreciated that the insurance agent computing device 165 may include one or more processors (e.g., one or more microprocessors, controllers, and/or any other suitable type of processor), one or more memories, one or more displays, etc.

In addition, further regarding the exemplary system 300, the illustrated exemplary components may be configured to communicate, e.g., via the network 104 (which may be a wired or wireless network, such as the internet), with any other component. Furthermore, although the exemplary system 300 illustrates only one of each of the components, any number of the example components are contemplated (e.g., any number of insurance claim complaint reviewing computing devices, social media companies, insurance complaint administrator computing devices, insurance agent computing devices, insurance customer computing devices, external databases, etc.).

Exemplary Training of an Exemplary Chatbot

The chatbot 324 may, inter alia, build complaint reports for insurance claims complaints, and/or converse with users. The chatbot 324 may be capable of understanding requests, providing relevant information, escalating issues. Additionally, the chatbot 324 may generate data from interactions which the enterprise may use to personalize future support and/or improve the chatbot's functionality, e.g., when retraining and/or fine-tuning the chatbot. Moreover, although the following discussion may refer to an ML chatbot or an ML model, it should be understood that it applies equally to an AI chatbot or an AI model. In addition, the following discussion applies equally to a voicebot.

The chatbot 324 may be trained by chatbot training application 326 using large training datasets of text which may provide sophisticated capability for natural-language tasks, such as answering questions and/or holding conversations. The chatbot 324 may include a general-purpose pretrained LLM which, when provided with a starting set of words (prompt) as an input, may attempt to provide an output (response) of the most likely set of words that follow from the input. In one aspect, the prompt may be provided to, and/or the response received from, the chatbot 324 and/or any other ML model, via a user interface of the insurance claims complaint reviewing computing device 302. This may include a user interface device operably connected to the server via an I/O module. Exemplary user interface devices may include a touchscreen, a keyboard, a mouse, a microphone, a speaker, a display, and/or any other suitable user interface devices.

Multi-turn (i.e., back-and-forth) conversations may require LLMs to maintain context and coherence across multiple user utterances, which may require the chatbot 324 to keep track of an entire conversation history as well as the current state of the conversation. The chatbot 324 may rely on various techniques to engage in conversations with users, which may include the use of short-term and long-term memory. Short-term memory may temporarily store information (e.g., in the memory 322 of the insurance claims complaint reviewing computing device 302) that may be required for immediate use and may keep track of the current state of the conversation and/or to understand the user's latest input in order to generate an appropriate response. Long-term memory may include persistent storage of information (e.g., the internal database 318 of the insurance claims complaint reviewing computing device 302) which may be accessed over an extended period of time. The long-term memory may be used by the chatbot 324 to store information about the user (e.g., preferences, chat history, etc.) and may be useful for improving an overall user experience by enabling the chatbot 324 to personalize and/or provide more informed responses.

In some embodiments, the system and methods to generate and/or train an ML chatbot model (e.g., via the chatbot training application 326) which may be used in the chatbot 324, may include three steps: (1) a supervised fine-tuning (SFT) step where a pretrained language model (e.g., an LLM) may be fine-tuned on a relatively small amount of demonstration data curated by human labelers to learn a supervised policy (SFT ML model) which may generate responses/outputs from a selected list of prompts/inputs. The SFT ML model may represent a cursory model for what may be later developed and/or configured as the ML chatbot model; (2) a reward model step where human labelers may rank numerous SFT ML model responses to evaluate the responses which best mimic preferred human responses, thereby generating comparison data. The reward model may be trained on the comparison data; and/or (3) a policy optimization step in which the reward model may further fine-tune and improve the SFT ML model. The outcome of this step may be the ML chatbot model using an optimized policy. In one aspect, step one may take place only once, while steps two and three may be iterated continuously, e.g., more comparison data is collected on the current ML chatbot model, which may be used to optimize/update the reward model and/or further optimize/update the policy.

Supervised Fine-Tuning ML Model

Figure 4:
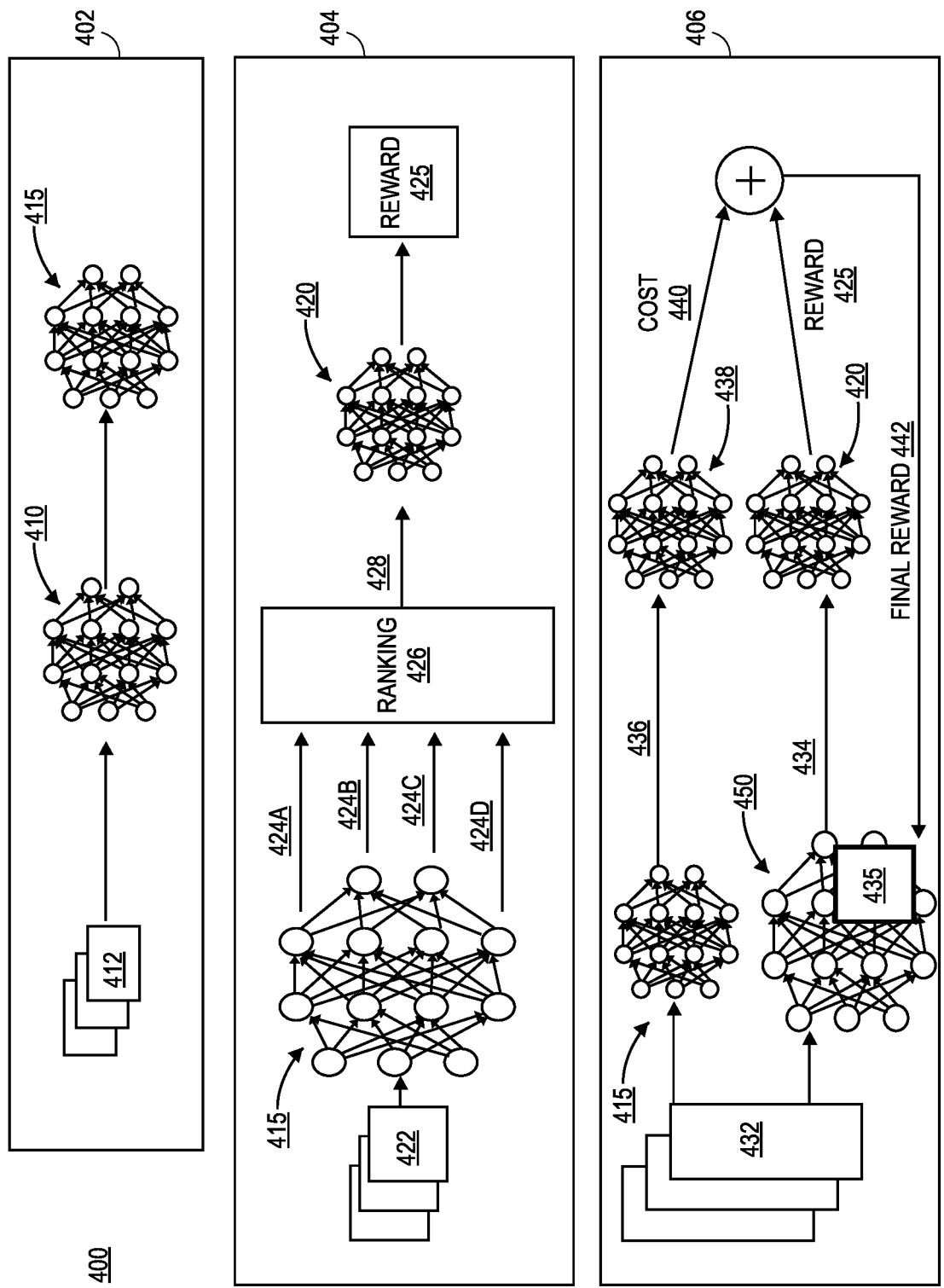
FIG. 4 depicts an exemplary combined block and logic diagram for exemplary training of another exemplary chatbot.

As an initial matter, although the discussion with respect to FIG. 4 refers to ML model 450, it should be understood that 450 may refer equally to an AI and/or ML algorithm and/or model.

FIG. 4 depicts a combined block and logic diagram 400 for training an ML chatbot model, in which the techniques described herein may be implemented, according to some embodiments. It should be understood that FIG. 4 may apply to training any chatbot described herein, and FIG. 4 should not be considered to be restricted to the chatbot 324. In addition, the chatbot 324 may be trained in accordance with any of the other techniques described herein; and the training of chatbot 324 should not be considered restricted to the teachings of FIG. 4.

Some of the blocks in FIG. 4 may represent hardware and/or software components, other blocks may represent data structures or memory storing these data structures, registers, or state variables (e.g., 412), and other blocks may represent output data (e.g., 425). Input and/or output signals may be represented by arrows labeled with corresponding signal names and/or other identifiers. The methods and systems may include one or more blocks 402, 404, 406, which will be described in further detail below.

In one aspect, at block 402, a pretrained language model 410 may be fine-tuned. The pretrained language model 410 may be obtained at block 402 and be stored in a memory, such as memory 322 and/or internal database 318. The pretrained language model 410 may be loaded into an ML training module at block 402 for retraining/fine-tuning. A supervised training dataset 412 may be used to fine-tune the pretrained language model 410 wherein each data input prompt to the pretrained language model 410 may have a known output response for the pretrained language model 410 to learn from. The supervised training dataset 412 may be stored in a memory at block 402, e.g., the memory 322 and/or the internal database 318. In one aspect, the data labelers may create the supervised training dataset 412 prompts and appropriate responses. The pretrained language model 410 may be fine-tuned using the supervised training dataset 412 resulting in the SFT ML model 415 which may provide appropriate responses to user prompts once trained. The trained SFT ML model 415 may be stored in a memory, such as the memory 322 and/or the internal database 318.

In one aspect, the supervised training dataset 412 may include prompts and responses. In some examples, the prompts and responses comprise insurance claims complaints, and complaint reports (e.g., historical insurance claims complaints, and historical complaint reports). In some embodiments, the supervised training dataset 412 may further include historical insurance customer profiles associated with the historical insurance claims complaints, and the historical insurance customer profiles may include information of historical homeowners insurance policies, historical renters insurance policies, historical auto insurance policies, historical life insurance policies, and/or historical disability insurance policies of historical insurance customers. In this way, the chatbot 324 may "learn" how an insurance customer profile should influence how the complaint report is built (e.g., if/what information from the insurance customer profile should be included in the summary 1720, etc.).

In some embodiments, the prompts and/or responses may include tags indicating how to categorize the prompts (e.g., the insurance claims complaints) into categories, subcategories, and/or insurance policy types. Example categories include the tone category, and the policy category. Examples of the tone subcategories include: (i) rudeness of a claims adjuster; (ii) length of time it took a claims adjuster to respond to an insurance customer; and/or (iii) difficulties with an application (app) and/or website. Examples of the policy subcategories include: (i) insurance policy did not cover damage or loss; (ii) deductible was too high; and/or (iii) subsequent increase in insurance policy premium. Examples of the insurance policy types include: a homeowners insurance policy, a renters insurance policy, an auto insurance policy, a life insurance policy, and/or a disability insurance policy.

For example, if the text 1520 of the exemplary insurance complaint 1500 is "my homeowners insurance policy didn't cover the water damage in my basement," this historical insurance claim complaint may have tag(s) for the policy category with a subcategory of insurance policy did not cover damage or loss, and an insurance policy type of homeowners insurance. In another example if the text 1520 of the exemplary insurance complaint 1500 is "the claims adjuster was rude to me when talking about my destroyed car," this historical insurance claim complaint may have tag(s) for the tone category with a subcategory of rudeness of a claims adjuster, and an insurance policy type of auto. In this way, the chatbot 324 may "learn" how to categorize insurance claims complaints.

The prompts and responses may also effectively train the chatbot 324 to use summaries of and/or quotations from the insurance claims complaints in the complaint reports that it builds. For instance, the responses in the supervised training dataset 412 may include summaries of and/or quotations from the prompts in the supervised training dataset 412.

Training the Reward Model

In one aspect, training the ML chatbot model 450 may include, at block 404, training a reward model 420 to provide as an output a scaler value/reward 425. The reward model 420 may be required to leverage Reinforcement Learning with Human Feedback (RLHF) in which a model (e.g., ML chatbot model 450) learns to produce outputs which maximize its reward 425, and in doing so may provide responses which are better aligned to user prompts.

Training the reward model 420 may include, at block 404, providing a single prompt 422 to the SFT ML model 415 as an input. However, it should be understood that in some examples, the prompt 422 includes more than one insurance claim complaint (e.g., thereby training the chatbot to build complaint reports that include more than one complaint, e.g., to include a table of insurance claims complaints, etc.). The input prompt 422 may be provided via an input device (e.g., a keyboard) of the insurance claims complaint reviewing computing device 302. The prompt 422 may be previously unknown to the SFT ML model 415, e.g., the labelers may generate new prompt data, the prompt 422 may include testing data stored on internal database 318, and/or any other suitable prompt data. The SFT ML model 415 may generate multiple, different output responses 424A, 424B, 424C, 424D to the single prompt 422. At block 404, the insurance claims complaint reviewing computing device 302 (and/or the insurance complaint administrator computing device 375, insurance agent computing device 165, etc.) may output the responses 424A, 424B, 424C, 424D via any suitable technique, such as outputting via a display (e.g., as text responses), a speaker (e.g., as audio/voice responses), etc., for review and/or rank by the data labelers.

In one example, a data labeler may provide, to the SFT ML model 415, an insurance complaint as an input prompt 422. The input may be provided by the labeler (e.g., via the insurance claims complaint reviewing computing device 302, etc.) to the insurance claims complaint reviewing computing device 302 running chatbot 324 utilizing the SFT ML model 415. The SFT ML model 415 may provide, as output responses to the labeler (e.g., via their respective devices), four different responses to the insurance claim complaint 424A, 424B, 424C, 424D. The data labeler may rank 426, via labeling the prompt-response pairs, prompt-response pairs 422/424A, 422/424B, 422/424C, and 422/424D from most preferred to least preferred. The labeler may rank 426 the prompt-response pair data in any suitable manner. The ranked prompt-response pairs 428 may be provided to the reward model 420 to generate the scalar reward 425. It should be appreciated that this facilitates training the chatbot 324 to determine complaint reports corresponding to insurance claims complaints.

The data labelers may provide feedback (e.g., via the insurance claims complaint reviewing computing device 302, etc.) on the responses 424A, 424B, 424C, 424D when ranking 426 them from best to worst based upon the prompt-response pairs. The data labelers may rank 426 the responses 424A, 424B, 424C, 424D by labeling the associated data. The ranked prompt-response pairs 428 may be used to train the reward model 420. In one aspect, the insurance claims complaint reviewing computing device 302 may load the reward model 420 via the chatbot training application 326 and train the reward model 420 using the ranked response pairs 428 as input. The reward model 420 may provide as an output the scalar reward 425.

In one aspect, the scalar reward 425 may include a value numerically representing a human preference for the best and/or most expected response to a prompt, i.e., a higher scaler reward value may indicate the user is more likely to prefer that response, and a lower scalar reward may indicate that the user is less likely to prefer that response. For example, inputting the "winning" prompt-response (i.e., input-output) pair data to the reward model 420 may generate a winning reward. Inputting a "losing" prompt-response pair data to the same reward model 420 may generate a losing reward. The reward model 420 and/or scalar reward 436 may be updated based upon labelers ranking 426 additional prompt-response pairs generated in response to additional prompts 422.

While the reward model 420 may provide the scalar reward 425 as an output, the reward model 420 may not generate a response (e.g., text). Rather, the scalar reward 425 may be used by a version of the SFT ML model 415 to generate more accurate responses to prompts, i.e., the SFT model 415 may generate the response such as text to the prompt, and the reward model 420 may receive the response to generate a scalar reward 425 of how well humans perceive it. Reinforcement learning may optimize the SFT model 415 with respect to the reward model 420, which may realize the configured ML chatbot model 450.

RLHF to Train the ML Chatbot Model

In one aspect, the insurance claims complaint reviewing computing device 302 may train the ML chatbot model 450 (e.g., via the chatbot training application 326) to generate a response 434 to a random, new and/or previously unknown user prompt 432. To generate the response 434, the ML chatbot model 450 may use a policy 435 (e.g., algorithm) which it learns during training of the reward model 420, and in doing so may advance from the SFT model 415 to the ML chatbot model 450. The policy 435 may represent a strategy that the ML chatbot model 450 learns to maximize its reward 425. As discussed herein, based upon prompt-response pairs, a human labeler may continuously provide feedback to assist in determining how well the ML chatbot's 450 responses match expected responses to determine rewards 425. The rewards 425 may feed back into the ML chatbot model 450 to evolve the policy 435. Thus, the policy 435 may adjust the parameters of the ML chatbot model 450 based upon the rewards 425 it receives for generating good responses. The policy 435 may update as the ML chatbot model 450 provides responses 434 to additional prompts 432.

In one aspect, the response 434 of the ML chatbot model 450 using the policy 435 based upon the reward 425 may be compared using a cost function 438 to the SFT ML model 415 (which may not use a policy) response 436 of the same prompt 432. The server 406 may compute a cost 440 based upon the cost function 438 of the responses 434, 436. The cost 440 may reduce the distance between the responses 434, 436, i.e., a statistical distance measuring how one probability distribution is different from a second, in one aspect the response 434 of the ML chatbot model 450 versus the response 436 of the SFT model 415. Using the cost 440 to reduce the distance between the responses 434, 436 may avoid a server over-optimizing the reward model 420 and deviating too drastically from the human-intended/preferred response. Without the cost 440, the ML chatbot model 450 optimizations may result in generating responses 434 which are unreasonable but may still result in the reward model 420 outputting a high reward 425.

In one aspect, the responses 434 of the ML chatbot model 450 using the current policy 435 may be passed by the server 406 to the rewards model 420, which may return the scalar reward or discount 425. The ML chatbot model 450 response 434 may be compared via cost function 438 to the SFT ML model 415 response 436 by the server 406 to compute the cost 440. The server 406 may generate a final reward 442 which may include the scalar reward 425 offset and/or restricted by the cost 440. The final reward or discount 442 may be provided by the server 406 to the ML chatbot model 450 and may update the policy 435, which in turn may improve the functionality of the ML chatbot model 450.

To optimize the ML chatbot model 450 over time, RLHF via the human labeler feedback may continue ranking 426 responses of the ML chatbot model 450 versus outputs of earlier/other versions of the SFT ML model 415, i.e., providing positive or negative rewards 425. The RLHF may allow the chatbot training application 326 to continue iteratively updating the reward model 420 and/or the policy 435. As a result, the ML chatbot model 450 may be retrained and/or fine-tuned based upon the human feedback via the RLHF process, and throughout continuing conversations may become increasingly efficient.

Although multiple blocks 402, 404, 406 are depicted in the exemplary block and logic diagram 400, each providing one of the three steps of the overall ML chatbot model 450 training, fewer and/or additional servers may be utilized and/or may provide the one or more steps of the chatbot 324 training. In one aspect, one server may provide the entire ML chatbot model 450 training.

In certain embodiments discussed herein, generative artificial intelligence (AI) models (also referred to as generative machine learning (ML) models) including voice bots or chatbots may be configured to utilize artificial intelligence and/or machine learning techniques. Data input into the voice bots, chatbots, or other bots may include historical insurance claim data, historical home data, historical water or fire damage data (including auto or home damage data), sensor information (including mobile device, home, and/or vehicle sensor, audio, and image data), damage mitigation and prevention techniques, and other data. The data input into the bot or bots may include text, documents, and images, such as text, documents and images related to homes, vehicles, claims, and water damage, damage mitigation and prevention, and sensors. In certain embodiments, a voice or chatbot may be a ChatGPT chatbot. The voice or chatbot may employ supervised or unsupervised machine learning techniques, which may be followed by, and/or used in conjunction with, reinforced or reinforcement learning techniques. In one aspect, the voice or chatbot may employ the techniques utilized for ChatGPT. The voice bot, chatbot, ChatGPT-based bot, ChatGPT bot, and/or other such generative model may generate audible or verbal output, text or textual output, visual or graphical output, output for use with speakers and/or display screens, and/or other types of output for user and/or other computer or bot consumption.

Exemplary Methods—AI-Based Reviewing Insurance Claims Complaints

Figure 20:
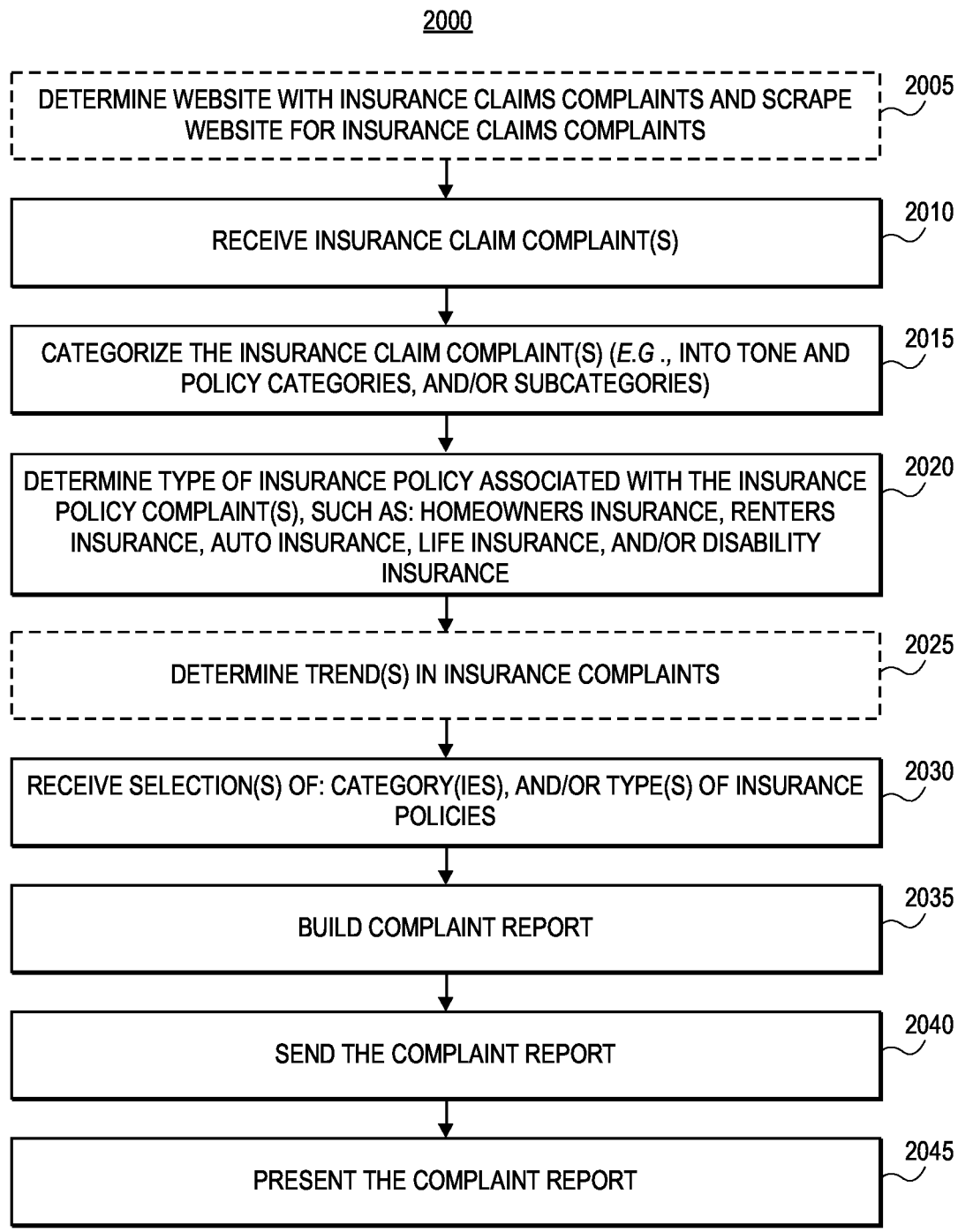
FIG. 20 depicts an exemplary computer-implemented method or implementation for AI-based reviewing insurance claims complaints.

FIG. 20 shows an exemplary computer-implemented method or implementation 2000 for AI-based reviewing of insurance claims complaints. Although the following discussion refers to the exemplary method or implementation 2000 as being performed by the one or more processors 320, it should be understood that any or all of the blocks may be alternatively or additionally performed by any other suitable component as well (e.g., one or more processors of the insurance complaint administrator computing device 375, one or more processors of the insurance customer computing device 155, one or more processors of the insurance agent computing device 165, one or more processors of the social media company 101, etc.).

The exemplary computer-implemented method or implementation 2000 may begin at optional block 2005 when the one or more processors 320 (e.g., via the chatbot 324) determine a website with insurance claims complaint(s) (e.g., via an internet search or any other suitable technique), and scrape the website for insurance claims complaint(s). The website may be hosted anywhere on the internet.

At block 2010, the one or more processors 320 receive one or more insurance claims complaints. The one or more insurance claims complaints may be received, for example: from the insurance customer computing device 155, from the insurance agent computing device 165, from the social media company 101, from the external database 180, via the website scraping of block 2005, etc. The one or more insurance claim complaints may be in any suitable form and/or format. For example, the one or more insurance claim complaints may be in a written format, such as an email, a text message, and/or a submission to a website and/or app (e.g., a website and/or app of the insurance company). Additionally or alternatively, the complaint may be auditory, and the chatbot 324 applies a Natural Language Processing (NLP) algorithm to the complaint.

The one or more processors 320 (e.g., via the chatbot 324) may place the complaint in a standardized form, such as a form illustrated by the exemplary insurance claim complaint 1500. In addition, the insurance claims complaints may include dates and/or times that the insurance claims complaints were placed.

At block 2015, the one or more processors 320 (e.g., via the chatbot 324) may categorize the one or more insurance claim complaint(s) into categories. For example, there may be a tone category (e.g., for complaints that are unrelated to or only minimally related to the insurance policy itself); and a policy category (e.g., for complaints related to the insurance policy itself).

Further at block 2015, the one or more processors 320 (e.g., via the chatbot 324) may categorize the one or more insurance claims complaints into subcategories (e.g., subcategories of the tone and/or policy categories). Examples of the tone subcategories include: (i) rudeness of a claims adjuster; (ii) length of time it took a claims adjuster to respond to an insurance customer; and/or (iii) difficulties with an application (app) and/or website. Examples of the policy subcategories include: (i) insurance policy did not cover damage or loss; (ii) deductible was too high; and/or (iii) subsequent increase in insurance policy premium.

The one or more insurance claims complaints may be categorized into the categories and/or subcategories by any suitable technique. For example, as explained above with respect to FIG. 4, during training, the supervised training dataset 212 may have included tags indicating categories and/or subcategories, thereby training the chatbot 324 how to categorize the one or more insurance claims complaints. Additionally or alternatively, a human (e.g., the insurance complaint administrator 370 via the insurance complaint administrator computing device 375) may categorize the one or more insurance claims complaints. For example, insurance claims complaints may be presented to the human with a category and/or subcategory suggested by the chatbot 324, and the human may choose to accept the suggested category and/or subcategory, or change the suggested category and/or subcategory.

At block 2020, the one or more processors 320 (e.g., via the chatbot 324) may determine a type of insurance policy associated with the insurance claim complaints. Examples of the types of insurance policy types include: a homeowners insurance policy, a renters insurance policy, a personal articles insurance policy, an auto insurance policy, a life insurance policy, and/or a disability insurance policy.

The type of insurance policy may be determined by any suitable technique. For example, the insurance customer 150 may have indicated it when filling out a form on a website or app when submitting the insurance claim complaint. In another example, as explained above with respect to FIG. 4, during training, the supervised training dataset 212 may have included tags indicating the types of insurance policies, thereby training the chatbot 324 how to categorize and/or determine types of insurance policies for the one or more insurance claims complaints.

At optional block 2025, the one or more processors 320 (e.g., via the chatbot 324) may determine trend(s) in the insurance complaints (e.g., based upon at least in part the dates and/or times the insurance claims complaints were placed, etc.). For example, a trend may be determined indicating an increase or decrease in a particular type of claim (e.g., homeowners insurance claims, renters insurance claims, auto insurance claims, personal articles insurance claims, life insurance claims, and/or disability insurance claims. Additionally or alternatively, trends may be determined for a particular geographic area (e.g., a state, city, zip code, within a predetermined distance [e.g., 1 mile, 10 miles, etc.] of a specific location, on a particular street). Additionally or alternatively, trends due to a particular cause of damage may be determined (e.g., hail damage, fire damage, frozen pipe damage, flood damage, wind damage, etc.). Additionally or alternatively, trends corresponding to a particular employee (e.g., insurance agent, claims adjustor, etc.) of the insurance company may be determined.

At block 2030, the one or more processors 320 (e.g., via the chatbot 324) may receive a selection of categories and/or types of insurance policies to include in the complaint report. The selection may be received from the entity that the complaint report is being built for (e.g., the insurance complaint administrator 370 via the insurance complaint administrator computing device 375; the insurance agent 160 via the insurance agent computing device 165; etc.). Additionally or alternatively, the one or more processors 320 (e.g., via the chatbot 324) may also receive (e.g., from the same entity) other parameters indicating how the complaint report should be built (e.g., if the complaint report should include tables indicating categories, subcategories, types of insurance claims complaints, etc.).

At block 2035, the one or more processors 320 (e.g., via the chatbot 324) may build the complaint report. The complaint report may include information of the insurance claim complaint and an indication of the category, such as illustrated in the examples of FIGS. 16-19. The complaint report may include or exclude information as indicated by the selection(s) received at block 2030. For example, if the selection indicated to include information of if the insurance customer 150 left the insurance company, this would be indicated in the complaint report, as illustrated in the examples of FIGS. 16 and 17. In another example, if the selection indicated to include imagery data (e.g., images and/or video) of the insured product, the report would include imagery data, such as picture 1740 of the exemplary complaint report 1700.

At block 2040, the one or more processors 320 (e.g., via the chatbot 324) send the complaint report (e.g., to the insurance complaint administrator computing device 375, the insurance agent computing device 165, etc.).

At block 2045, the complaint report is presented. For example, the complaint report may be displayed on a display of the insurance complaint administrator computing device 375, the insurance agent computing device 165, the insurance claims complaint reviewing computing device 302, etc. Additionally or alternatively, the complaint report may be verbally or audibly presented (e.g., via any of: the insurance complaint administrator computing device 375, the insurance agent computing device 165, the insurance claims complaint reviewing computing device 302, etc.).

Moreover, embodiments described herein improve technical functioning. For example, embodiments disclosed herein allow an insurance complaint administrator 370 to address more insurance claims complaints in a shorter time period. For example, by training the chatbot with the disclosed category tags, the chatbot 324 is able to accurately and quickly create a table, such as the exemplary tables 1815, 1825, 1910, thereby greatly reducing the amount of time necessary to address insurance claims complaints.

It should be understood that not all blocks and/or events of the exemplary signal diagrams and/or flowcharts are required to be performed. Moreover, the exemplary signal diagrams and/or flowcharts are not mutually exclusive (e.g., block(s)/events from each example signal diagram and/or flowchart may be performed in any other signal diagram and/or flowchart). The exemplary signal diagrams and/or flowcharts may include additional, less, or alternate functionality, including that discussed elsewhere herein.

Additional Exemplary Embodiments—AI-Based Reviewing Insurance Claims Complaints

In one aspect, a computer-implemented method for reviewing insurance claims complaints may be provided. The method may be implemented via one or more local or remote processors, sensors, transceivers, servers, memory units, augmented reality glasses or headsets, virtual reality headsets, extended or mixed reality headsets, smart glasses or watches, wearables, voice bot or chatbot, ChatGPT bot, and/or other electronic or electrical components. For instance, in one example, the method may include: (1) receiving, via a chatbot of one or more processors, an insurance claim complaint; (2) categorizing, via the chatbot, the insurance claim complaint by determining a category of the insurance claim complaint, the category comprising a tone category or a policy category; (3) building, via the chatbot, a complaint report including information of the insurance claim complaint and an indication of the category; and/or (4) sending, via the chatbot, the complaint report to an insurance complaint administrator computing device. The method may include additional, fewer, or alternate actions, including those discussed elsewhere herein.

In some embodiments, the tone category comprises tone subcategories comprising: (i) rudeness of a claims adjuster; (ii) length of time it took a claims adjuster to respond to an insurance customer; and/or (iii) difficulties with an application (app) and/or website; and/or the policy category comprises policy subcategories comprising: (i) insurance policy did not cover damage or loss; (ii) deductible was too high; and/or (iii) subsequent increase in insurance policy premium.

In some embodiments, the receiving the insurance claim complaint comprises receiving a plurality of insurance claims complaints including the insurance claim complaint; and/or the complaint report includes a subreport of only tone category insurance claims complaints, and/or a subreport of only policy category insurance claims complaints.

In some embodiments, the receiving the insurance claim complaint comprises receiving a plurality of insurance claims complaints including the insurance claim complaint; and/or the complaint report comprises a table including indications of if the insurance complaints are tone category insurance claims complaints or policy category insurance claims complaints.

In some embodiments, the receiving the insurance claim complaint comprises receiving a plurality of insurance claims complaints including the insurance claim complaint, and wherein insurance claims complaints of the plurality of insurance claims complaints include dates and/or times of insurance claims; and/or the method further comprises determining a trend in the insurance claims based upon the dates and/or times.

In some embodiments, the trend comprises an increase or decrease in the insurance claims: corresponding to a type of insurance policy associated with the insurance claim complaints, the type of insurance policy comprising a homeowners insurance policy, a renters insurance policy, an auto insurance policy, a life insurance policy and/or a disability insurance policy; in a particular geographic area; and/or due to a cause of damage, the cause of damage including: hail damage, fire damage, frozen pipe damage, flood damage, and/or wind damage.

In some embodiments, the method further includes: determining, via the chatbot, a type of insurance policy associated with the insurance claim complaint, the type of insurance policy comprising a homeowners insurance policy, a renters insurance policy, an auto insurance policy, a life insurance policy and/or a disability insurance policy; and/or receiving, via the chatbot, from the insurance complaint administrator computing device, a selection of a type of insurance policy; wherein the building of the complaint report includes building the complaint report to include only insurance complaints with the selected type of insurance policy.

In some embodiments, the building of the complaint report includes building the complaint report to include an indication of if an insurance customer of the insurance claims complaint left an insurance company of the insurance claim.

In certain embodiments, the method further includes: determining, via the one or more processors, a website with the insurance claim complaint; and/or scraping, via the one or more processors, the insurance claim complaint from the website.

In some embodiments, the method further includes comprising training the chatbot with a historical dataset comprising: (i) historical insurance claims complaints, and/or (ii) historical complaint reports.

In certain embodiments, the chatbot includes: an artificial intelligence (AI) chatbot, a machine learning (ML) chatbot, a generative AI chatbot, a deep learning algorithm, a generative pre-trained transformer (GPT), and/or long-short-term-memory (LSTM).

In some embodiments, the information of the insurance claim complaint includes: an indication of a type of insurance policy associated with the insurance claim complaint, the type of insurance policy comprising a homeowners insurance policy, a renters insurance policy, an auto insurance policy, a personal articles or personal belongings insurance policy, a life insurance policy and/or a disability insurance policy; a quotation from correspondence between an insurance customer of the insurance claim complaint and an employee of the insurance company, wherein the employee of the insurance company is a claims adjustor or an insurance agent; a summary of the insurance claim complaint; dates and/or times of one or more correspondences between the insurance customer and the employee; and/or imagery data corresponding to the insurance claim complaint including imagery data of an insured item of an insurance claim of the insurance claim complaint.

In another aspect, a computer system for reviewing insurance claims complaints may be provided. The computer system may include one or more local or remote processors, sensors, transceivers, servers, memory units, augmented reality glasses or headsets, virtual reality headsets, extended or mixed reality headsets, smart glasses or watches, wearables, voice bot or chatbot, ChatGPT bot, and/or other electronic or electrical components. For example, in one instance, the computer system may include one or more processors configured to: (1) receive, via a chatbot, an insurance claim complaint; (2) categorize, via the chatbot, the insurance claim complaint by determining a category of the insurance claim complaint, the category comprising a tone category or a policy category; (3) build, via the chatbot, a complaint report including information of the insurance claim complaint and an indication of the category; and/or (4) send, via the chatbot, the complaint report to an insurance complaint administrator computing device. The computer system may include additional, less, or alternate functionality, including that discussed elsewhere herein.

In some embodiments, the tone category comprises tone subcategories comprising: (i) rudeness of a claims adjuster; (ii) length of time it took a claims adjuster to respond to an insurance customer; and/or (iii) difficulties with an application (app) and/or website; and/or the policy category comprises policy subcategories comprising: (i) insurance policy did not cover damage or loss; (ii) deductible was too high; and/or (iii) subsequent increase in insurance policy premium.

In some embodiments, the one or more processors are configured to receive the insurance claim complaint by receiving a plurality of insurance claims complaints including the insurance claim complaint; and/or the complaint report includes a subreport of only tone category insurance claims complaints, and/or a subreport of only policy category insurance claims complaints.

In some embodiments, the computer system further comprises a display device, and wherein the one or more processors are further configured to display the response on the display device.

In yet another aspect, a computer device for reviewing insurance claims complaints may be provided. The computer device may include one or more local or remote processors, sensors, transceivers, servers, memory units, augmented reality glasses or headsets, virtual reality headsets, extended or mixed reality headsets, smart glasses or watches, wearables, voice bot or chatbot, ChatGPT bot, and/or other electronic or electrical components. For instance, in one example, the computer device may include: one or more processors; and/or one or more memories coupled to the one or more processors. The one or more memories including computer executable instructions stored therein that, when executed by the one or more processors, may cause the one or more processors to: (1) receive, via a chatbot, an insurance claim complaint; (2) categorize, via the chatbot, the insurance claim complaint by determining a category of the insurance claim complaint, the category comprising a tone category or a policy category; (3) build, via the chatbot, a complaint report including information of the insurance claim complaint and an indication of the category; and/or (4) send, via the chatbot, the complaint report to an insurance complaint administrator computing device. The computer device may include additional, less, or alternate functionality, including that discussed elsewhere herein.

In some embodiments, the one or more memories having stored thereon computer executable instructions that, when executed by the one or more processors, cause the one or more processors to receive the insurance claim complaint by receiving the insurance claims complaint from an insurance customer computing device.

In certain embodiments, the one or more memories having stored thereon computer executable instructions that, when executed by the one or more processors, cause the one or more processors to receive the insurance claim complaint by receiving a plurality of insurance claims complaints including the insurance claim complaint; and/or wherein the complaint report includes a subreport of only tone category insurance claims complaints, and/or a subreport of only policy category insurance claims complaints.

In some embodiments, the one or more memories having stored thereon computer executable instructions that, when executed by the one or more processors, cause the one or more processors to control a display device to display the response.

Other Matters

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as "processing," "computing," "calculating," "determining." "presenting." "displaying." or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising." "includes," "including." "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

Furthermore, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A computer-implemented method for responding to a social media post, comprising:
   receiving, via a chatbot of one or more processors, a social media post;
   categorizing, via the chatbot, the social media post, wherein the categorizing comprises determining a category of the social media post, the category comprising: (i) customer praise of a company; or (ii) customer praise of a product and/or service;
   determining, via the chatbot, based upon the categorization, an entity to contact, the entity to contact comprises a user who posted the social media post;
   building, via the chatbot, based upon the determined entity to contact, a response to the social media post, the response including (a) a request that the user post a review of the company, product, and/or service, and/or (b) a recommendation to purchase an additional product and/or service; and
   sending, via the chatbot, the response to the entity.

2. The computer-implemented method of claim 1, wherein the determining the entity to contact further comprises determining a company referenced in the social media post.

3. The computer-implemented method of claim 1, further comprising training the chatbot with a historical dataset comprising: (i) historical social media posts, and/or (ii) historical responses to the historical social media posts.

4. The computer-implemented method of claim 1, wherein the chatbot includes: an artificial intelligence (AI) chatbot, a machine learning (ML) chatbot, a generative AI chatbot, a deep learning algorithm, a generative pre-trained transformer (GPT), and/or long-short-term-memory (LSTM).

5. The computer-implemented method of claim 1, wherein the building the response includes building the response to include the recommendation to purchase the additional product and/or service including a homeowners insurance policy, a renters insurance policy, an auto insurance policy, a life insurance policy and/or a disability insurance policy.

6. The computer-implemented method of claim 5 wherein the chatbot is trained based upon:
   a historical dataset comprising: (i) historical social media posts, and/or (ii) historical responses to the historical social media posts; and
   historical insurance customer profiles associated with the historical social media posts, the historical insurance customer profiles including information of historical homeowners insurance policies, historical renters insurance policies, historical auto insurance policies, historical life insurance policies, and/or historical disability insurance policies of historical insurance customers.

7. A computer system for responding to a social media post, the computer system comprising one or more processors configured to:
   receive, via a chatbot, a social media post;
   categorize, via the chatbot, the social media post, wherein the categorizing comprises: determining a category of the social media post, the category comprising: (i) customer praise of a company; or (ii) customer praise of a product and/or service;
   determine, via the chatbot, based upon the categorization, an entity to contact, the entity to contact comprises a user who posted the social media post;
   build, via the chatbot, based upon the determined entity to contact, a response to the social media post, the response including (a) a request that the user post a review of the company, product, and/or service, and/or (b) a recommendation to purchase an additional product and/or service; and
   send, via the chatbot, the response to the entity.

8. The computer system of claim 7, wherein the computer system further comprises a display device, and wherein the one or more processors are further configured to display the response on the display device.

9. The computer system of claim 7, wherein the chatbot is trained with a historical dataset comprising: (i) historical social media posts, and/or (ii) historical responses to the historical social media posts.

10. The computer system of claim 7, wherein the chatbot includes: an artificial intelligence (AI) chatbot, a machine learning (ML) chatbot, a generative AI chatbot, a deep learning algorithm, a generative pre-trained transformer (GPT), and/or long-short-term-memory (LSTM).

11. A computer-implemented method for responding to a social media post, comprising:
    receiving, via a chatbot, a social media post;
    categorizing, via the chatbot, the social media post, wherein the categorizing comprises determining a category of the social media post, the category comprising: (i) customer praise of a company; or (ii) customer praise of a product and/or service;
    determining, via the chatbot, based upon the categorization, an entity to contact, the entity to contact comprises an employee;
    building, via the chatbot, based upon the determined entity to contact, a response to the social media post, the response including a list of one or more products and/or services for the employee to suggest to a user post the social media post; and
    sending, via the chatbot, the response to the entity.

12. The computer-implemented method of claim 11, wherein the determining the entity to contact further comprises determining the company referenced in the social media post.

13. The computer-implemented method of claim 11, further comprising training the chatbot with a historical dataset comprising: (i) historical social media posts, and/or (ii) historical responses to the historical social media posts.

14. The computer-implemented method of claim 11, wherein the chatbot includes: an artificial intelligence (AI) chatbot, a machine learning (ML) chatbot, a generative AI chatbot, a deep learning algorithm, a generative pre-trained transformer (GPT), and/or long-short-term-memory (LSTM).

15. The computer-implemented method of claim 11, wherein the building the response includes building the response to include a recommendation to purchase a product including a homeowners insurance policy, a renters insurance policy, an auto insurance policy, a life insurance policy and/or a disability insurance policy.

16. The computer-implemented method of claim 15, wherein the chatbot is trained based upon:
    a historical dataset comprising: (i) historical social media posts, and/or (ii) historical responses to the historical social media posts; and
    historical insurance customer profiles associated with the historical social media posts, the historical insurance customer profiles including information of historical homeowners insurance policies, historical renters insurance policies, historical auto insurance policies, historical life insurance policies, and/or historical disability insurance policies of historical insurance customers.

\* \* \* \* \*